US007028693B2

(12) United States Patent
Brue

(10) Patent No.: US 7,028,693 B2
(45) Date of Patent: Apr. 18, 2006

(54) SMOKING REDUCTION METHOD

(76) Inventor: Vesta L. Brue, 2635 Puesta Del Sol, Santa Barbara, CA (US) 93105

( * ) Notice: Subject to any disclaimer, the term of this patent is extended or adjusted under 35 U.S.C. 154(b) by 431 days.

(21) Appl. No.: 10/398,534

(22) PCT Filed: Jun. 20, 2002

(86) PCT No.: PCT/US02/19327

§ 371 (c)(1),
(2), (4) Date: Jun. 12, 2003

(87) PCT Pub. No.: WO03/001479

PCT Pub. Date: Jan. 3, 2003

(65) Prior Publication Data

US 2004/0031498 A1    Feb. 19, 2004

Related U.S. Application Data

(60) Provisional application No. 60/299,558, filed on Jun. 20, 2001, provisional application No. 60/322,124, filed on Sep. 14, 2001.

(51) Int. Cl.
*A24F 47/00* (2006.01)
(52) U.S. Cl. .................... 131/270; 131/328; 434/236
(58) Field of Classification Search ............... 131/328, 131/270; 434/236, 238; 206/242, 259, 265; D27/172, 183, 186, 187, 189
See application file for complete search history.

(56) References Cited

U.S. PATENT DOCUMENTS

| 2,613,527 | A | 10/1952 | Harris | 70/273 |
|---|---|---|---|---|
| 3,424,123 | A | 1/1969 | Giffard | 116/2 |
| 3,861,523 | A | 1/1975 | Fountain et al. | 206/236 |
| 3,944,796 | A | 3/1976 | Fitzpatrick | 235/151 |
| 3,963,033 | A | 6/1976 | Pope | 131/170 A |
| 4,037,719 | A | 7/1977 | Perlmutter | 206/266 |
| 4,076,118 | A | 2/1978 | Karlsson | 206/268 |
| 4,311,448 | A | 1/1982 | Strauss | 431/14 |
| 4,360,125 | A | 11/1982 | Martindale et al. | 221/2 |
| 4,459,036 | A | 7/1984 | Sado et al. | 368/251 |
| 4,530,068 | A | 7/1985 | Nakanishi et al. | 364/900 |
| 4,579,222 | A * | 4/1986 | Olazabal | 206/87 |
| 4,615,681 | A | 10/1986 | Schwarz | 434/236 |
| 4,620,555 | A | 11/1986 | Schwarz | 131/270 |
| 4,853,854 | A | 8/1989 | Behar et al. | 364/413.01 |
| 4,862,431 | A * | 8/1989 | Drouin | 368/10 |
| 5,207,580 | A | 5/1993 | Strecher | 434/238 |
| 5,217,379 | A | 6/1993 | Kirschenbaum et al. | 434/236 |
| 5,759,042 | A | 6/1998 | Laka | 434/236 |
| 5,778,897 | A | 7/1998 | Nordlicht | 131/279 |
| 5,826,715 | A | 10/1998 | Thompson | 206/261 |
| 5,833,466 | A | 11/1998 | Borg | 434/236 |
| 5,908,301 | A | 6/1999 | Lutz | 434/236 |
| 5,960,411 | A | 9/1999 | Hartman et al. | 705/26 |
| 5,967,789 | A | 10/1999 | Segel et al. | 434/236 |
| 6,125,082 | A | 9/2000 | Reid | 368/10 |
| D440,352 | S | 4/2001 | Gore et al. | D27/186 |
| 6,060,997 | A1* | 8/2003 | Brue | 131/270 |

* cited by examiner

*Primary Examiner*—Dionne A. Walls
(74) *Attorney, Agent, or Firm*—Hemingway & Hansen, LLP.; Eugenia S. Hansen

(57) ABSTRACT

The invention is a method to reduce the number of cigarettes consumed by a smoker, preferably towards the goal of eventual cessation. The method comprises collecting data that describes a smoker's cigarette consumption, using said data to generate a reduced smoking regimen, and implementing said reduced smoking regimen. By reducing the number of cigarettes consumed and equally distributing their consumption over the smoker's smoking hours, the method helps the smoker to reduce tobacco consumption and break psychological smoking associations. The method implemented for tobacco reduction is flexible enough to accomodate smokers who are not compliant as it continues to reduce scheduled consumption. Likewise, the method may accomodate smokers capable of accelerating their reduction.

30 Claims, 10 Drawing Sheets

SMOKING REDUCTION METHOD

This application is a 371 of PCT/US/02/19327 filed Jun. 20, 2002, which claims benefit of Provisional Application No. 60/299,558 filed Jun. 20, 2001, and claims benefit of Provisional Application No. 60/322,124 filed Sep. 14, 2001.

TECHNICAL FIELD OF INVENTION

This invention relates to a method to reduce the number of cigarettes consumed by a smoker.

BACKGROUND

Because nicotine is an addictive legal drug and consumed through a socially tolerated behavior, smoking threatens worldwide health. If smoking levels continue at their present rates, an estimated 1 billion people will have died from tobacco-related causes between 1900 and 2100 (Peto, et al. 1999. "Tobacco—the growing epidemic," *Nat Med* 5:15–17). In the United States alone, there are 48 million smokers. Every year, approximately half of U.S. smokers make a serious attempt to quit, but only 1 million (2% of smokers) succeed (Centers for Disease Control. 1997. *State-specific prevalence of cigarette smoking among adults, and children's and adolescent's exposure to environmental tobacco smoke.*). Overall, 50% of smokers will never succeed in conquering their addiction (Hughes, J. R. 1998. "Harm reduction approaches to smoking. The need for data," *Am J Prev Med* 15:78–79). For public health advocates and the families of smokers, these statistics are highly disappointing. Considering the high failure rates with smoking cessation programs, tobacco control experts are devising new strategies for improving cessation processes and reducing the health risks of tobacco consumption. Reducing tobacco use has gained favor as a pre-cessation stage and as a strategy to reduce smoking's harmful effects for those who are unwilling or unable to quit smoking. The goal of eventual abstinence from cigarettes is no less relevant, but the means of reaching that goal now may include smoking reduction.

The goal of smoking reduction is not only more palatable to addicted smokers, but studies show tangible benefits from smoking reduction, even if cessation cannot be eventually achieved. The dose response relationship of tobacco consumption to morbidity and mortality demonstrates that smoking cessation is not the only way to improve a smoker's health; reducing the amount of cigarettes smoked also improves health (Thun, et al. 1995. "Excess mortality among cigarette smokers: changes in a 20-year interval," *Am: J Public Health* 85:1223–1230; Jimenez-Ruiz, et al. 1998. "Nicotine replacement: a new approach to reducing tobacco-related harm," *Eur Respir J* 11:473–479; Burns, et al. 1997. "What should be the elements of any settlement with the tobacco industry?" *Tob Control* 6:1–4; Henningfield, J. E. and Slade, J. 1998. "Tobacco-dependence medications: public health and regulatory issues," *Food Drug Law J* 53 suppl: 75–114; Hughes, J. R. 1995. "Treatment of nicotine dependence. Is more better?" *JAMA* 274:1390–1391; Shiffman, et al. 1995. "Nicotine withdrawal in chippers and regular smokers: subjective and cognitive effects," *Healthy Psychol* 14:301–309). Even the risk of lung cancer is related to the amount of tobacco used; the risk of lung cancer in the smoking population over the non-smoking population has been reported to be 10-fold greater for those who smoke 1–10 cigarettes daily, 40-fold greater for those who smoke 21–30 cigarettes daily, and 70-fold greater in those who smoke 40 or more cigarettes daily (Wynder, E. L. and Stellman, S. D. 1979. "Impact of long-term filter cigarette usage on lung and larynx cancer risk: a case-control study," *J Natl Cancer Inst* 62:471–477). Importantly, smokers who cannot quit smoking entirely but who do substantially reduce their cigarette intake are able to maintain their smoking habit at reduced levels over long time periods (Norregaard, et al. 1992. "Smoking habits in relapsed subjects from a smoking cessation trial after one year," *Br J Addict* 87:1189–1194). Public health advocates want smokers to give up their smoking habit completely, but this goal may not be realistic for all smokers. Because smoking reduction in many smokers is attractive compared to smoking cessation in few smokers, the United Nations Focal Point on Tobacco and Health recommends a triadic approach to tobacco control: 1) tobacco use prevention, 2) tobacco use cessation, and 3) tobacco exposure reduction.

Smoking cessation methods fall into only a few categories. Self-help programs are popular among smokers because of their convenience and limited financial burden. Self-quitters achieve only a 2–3% abstinence rate, while quitters utilizing physician prescribed treatments achieve a 20–30% abstinence rate (Agency for Health Care Policy and Research, U.S. Department of Health and Human Services. 1996. *Treating Tobacco Use and Dependence*). Of the self-quitters very few are able to quit "cold turkey" (i.e., abrupt, complete smoking cessation). Most successful quitters do so with the aid of pharmaceuticals or non-pharmaceutical devices. Pharmaceuticals such as transdermal nicotine patches, nicotine gum, inhalers, and sublingual tablets attempt to treat cigarette addiction in smokers by replacing nicotine.

U.S. Pat. No. 4,311,448 issued to Strauss discloses a cigarette lighter programmed with a timing mechanism to permit striking only at predetermined intervals. Based on the smoker's habit, the lighter increases the length of the intervals by a fixed percentage so there can be fewer striking events over time. Other smoking related devices are disclosed which use a similar timing mechanism to schedule smoking related events. However, none of the devices monitor actual cigarette consumption.

U.S. Pat. No. 4,615,681 issued to Schwartz discloses a cigarette dispenser and method for smoking cessation. The method requires the smoker to press a button on the dispenser when he or she has an urge to smoke a cigarette. The pressed button activates a timing mechanism to count down a predetermined amount of time chosen by the smoker as a waiting period until the cigarette will be dispensed. If the smoker removes a cigarette from the dispenser before the timer has finished counting down, the dispenser emits an alarm to embarrass the smoker. Other timers and counting mechanisms on the dispenser are disclosed which monitor the dispenser opening without time-stamping the event, count the total number of cigarettes removed from the dispenser after the waiting period, and count the total number of cigarettes removed from the dispenser before the waiting period. This method and dispenser requires the smoker to determine the length of the waiting period before smoking a cigarette.

U.S. Pat. No. 4,853,854 issued to Behar discloses a smoking cessation method and a handheld timing device. During a baseline measurement period, the smoker interacts with the device by depressing buttons when he or she consumes a cigarette. Based on user inputs that generate baseline data, the device generates a withdrawal program of scheduled smoking events at a constant interval throughout the day and signals to the smoker when a cigarette can be smoked. The device's schedule for reduced cigarette consumption is designed to achieve total smoking cessation in 28 days. Because the device is not physically linked to the dispensing of cigarettes, the smoker is required to interact with the handheld device independently of the smoking process each and every time a cigarette is consumed. It offers no feedback to the user as to numbers of button presses, and thus does not indicate the quantity of cigarette usage.

U.S. Pat. No. 5,778,897 issued to Nordlicht discloses a smoking cessation method and tamper resistant cigarette dispenser. The method entails dispensing a cigarette at predetermined and evenly spaced times throughout the day, thereby removing the smoker's ability to control when he or she smokes a cigarette. The interval between dispensing events is programmed by someone other than the smoker either manually or electronically. Electronic programming can be accomplished from a remote location. By dispensing a cigarette at regular intervals, the smoker's idiosyncratic smoking pattern is disrupted. The dispenser is continually reprogrammed to increase the interval between dispensing events, resulting in the smoker's gradual withdrawal from cigarette consumption. At a critical interval, the method requires "cold turkey" smoking cessation, at which time the dispenser stops dispensing cigarettes. Because the method cannot record unscheduled cigarette consumption, a smoker may appear to be complying when, in fact, he or she is not. Thus, the smoker's ability to abstain from cigarette consumption can be overestimated, resulting in a premature "cold turkey" phase before the smoker has regularized his or her cigarette consumption.

U.S. Pat. No. 6,125,082 issued to Reid discloses a cigarette dispenser that dispenses a single cigarette at regularly timed intervals. The dispenser cannot be opened by the smoker unless it is empty, limiting the number of cigarettes a smoker can access at a given time. The dispenser has a display screen to display the date, time and encouraging messages, and a keypad to allow the smoker to enter new messages, extend time between dispensing events, or to enter a sleep cycle time or delay time. The smoker determines the interval between dispensing events. The dispenser does not record cigarette consumption.

All reported methods using smoking cessation aids have as their end goal complete abstinence from cigarettes, and for this reason, may not be suited to reducing smoking consumption. A smoker who is unable to quit smoking entirely while using a smoking cessation aid may become discouraged and resume his or her smoking routine. There is a need for a method to help smokers at least reduce, if not end, their smoking habit. The invention described herein is a method implemented by a device to reduce cigarette consumption in smokers wanting to reduce their cigarette consumption, preferably with an ultimate goal of eliminating their smoking habit.

SUMMARY OF INVENTION

In one aspect, the invention is a method for reducing cigarette consumption comprising collecting data that describes a smoker's cigarette consumption, using said data to generate a reduced smoking regimen, and implementing said reduced smoking regimen. During a data collection period, the indicia that describe a smoker's cigarette consumption are recorded including the number of smoking minutes, the number of cigarettes consumed during each smoking minutes subunit, the time of day at which the smoking minutes subunit began, and the time of day at which the smoking minutes subunit ended. The data collection period is at least two units, but in a most preferred embodiment is seven units. At the end of the data collection period, a schedule for reduced cigarette consumption is generated. A goal amount of cigarette reduction is chosen, preferably between 20% and 75%. In one embodiment, the goal amount of cigarette reduction is to be reached in a first stage and a second stage. In a preferred embodiment, a reduction of about 30 to 40% is a goal reduction in said first stage, with the remainder in said second stage. Most preferably, a goal of 37% reduction is used for said first stage and 13–27% reduction is used for said second stage, thereby reducing consumption by at least 50% overall. The number of cigarettes to be scheduled for consumption during a reduced smoking period is calculated by multiplying the goal amount of cigarette reduction by the number of cigarettes consumed during a previous corresponding period. The interval at which cigarettes are scheduled for consumption during a reduced smoking period is calculated by dividing the number of smoking minutes by the number of cigarettes to be consumed. The method is most preferably implemented by a device capable of signaling to the smoker when a cigarette is scheduled for consumption and recording cigarette consumption, or an action deemed equivalent to cigarette consumption. The schedule for reduced cigarette consumption can be generated within the device or by a remote processing means.

In another aspect, the invention is a method for reducing cigarette consumption comprising providing a programmable device suitable for holding cigarettes having a lid which removably engages with the device, wherein the lid possesses an actuation means that provides a signal to a data collection unit integrated in the device upon change of the position of the lid from a first closed position to a second open position, wherein each change of the position of the lid from a first closed position to a second opened position is deemed equivalent to a smoking event, and a communication means perceivable to the smoker. The method comprises collecting data that describes a smoker's cigarette consumption, using said data to generate a reduced smoking regimen, and implementing said reduced smoking regimen. A data collection period describes a smoker's cigarette consumption by recording the number of smoking minutes, the number of cigarettes consumed during each smoking minutes subunit, the time of day at which the smoking minutes subunit began, the time of day at which the smoking minutes subunit ended, and the time of the smoker's first cigarette of the day. The data collection period is at least two units, but in a most preferred embodiment is seven units. At the end of the data collection period, a schedule for reduced cigarette consumption is generated. A goal amount of cigarette reduction is chosen, preferably between 20% and 75%. In a most preferred embodiment, the goal amount of cigarette reduction is at least 50%. The number of cigarettes to be scheduled for consumption during a reduced smoking period is calculated by multiplying the goal amount of cigarette reduction by the number of cigarettes actually consumed in a previous period. The interval at which cigarettes are scheduled for consumption during a reduced smoking period is calculated by dividing the number of smoking minutes by the number of cigarettes to be consumed. In addition, the time of the smoker's first cigarette of the day will be delayed during the smoking reduction period in comparison with the data collection period. The amount of delay of said first cigarette of the day will preferably be increased each smoking day of said reduction period, either in comparison to a comparable smoking day of the data collection period or prior smoking reduction period or in comparison to the immediately preceding smoking day or both, although the length of the smoking day will remain constant. Prefereably, the delay is from five to thirty minutes per smoking day. The amount of delay may be adjusted depending on compliance data from the smoker and nicotine addiction of the smoker.

In yet another aspect, the invention is a method for reducing cigarette consumption comprising providing a programmable device comprising a recording means by which the smoker signals a smoking event and a communication means perceivable to the smoker. The method comprises collecting data that describes a smoker's cigarette consumption, using said data to generate a reduced smoking regimen, and implementing said reduced smoking regimen. A data collection period describes a smoker's cigarette consumption by recording data comprising the number of smoking minutes, the number of cigarettes consumed during each smoking minutes subunit, the time of day at which the smoking minutes subunit began, and the time of day at which the smoking minutes subunit ended, and the time of the smoker's first cigarette of the day. The data collection period is at least two units, but in a most preferred embodiment is seven units. At the end of the data collection period, a schedule for reduced cigarette consumption is generated. A goal amount of cigarette reduction is chosen, preferably between 20% and 75%. In a most preferred embodiment, the goal amount of cigarette reduction is 50%. The number of cigarettes to be scheduled for consumption during a reduced smoking period is calculated by multiplying the goal amount of cigarette reduction by the number of cigarettes actually consumed in a previous period. The interval at which cigarettes are scheduled for consumption during a reduced smoking period is calculated by dividing the number of smoking minutes by the number of cigarettes to be consumed.

In yet another aspect, the invention is a device useful for the diminution or cessation of consumption or use of cigarettes comprising a case body dimensioned to contain said habit-forming substance wherein the case body comprises an upper portion and a lower portion capable of being adjusted to variable fixed lengths to accommodate cigarettes of various lengths, a lid which removably engages with the upper portion of the case body, a lid actuation device which provides a signal to a data collection unit integrated in the device upon change of position of the lid from a first closed position to a second opened position, and a communication means which provides a smoker with a perceivable schedule for cigarette use.

BRIEF DESCRIPTION OF THE DRAWINGS

In FIG. 1A, the data collection period is comprised of three units, each unit being comprised of a smoking minutes subunit ($z_1$, $z_2$, and $z_{2+x}$) and a nonsmoking minutes subunit ($y_1$, $y_2$, and $y_{2+x}$), wherein x is one or greater. Cigarette consumption events are denoted with lowercase letters where a, d, and g are first cigarettes consumed during the smoking minutes subunit and c, f, and i are last cigarettes consumed during the smoking minutes subunit. Cigarettes consumed between the first and last cigarettes of the smoking minutes subunit are represented by $b_0 \to b_n$, $e_0 \to e_n$, and $h_0 \to h_n$, wherein $b_0$, $e_0$ and $h_0$ represents no cigarettes smoked between the first and last cigarettes of the smoking minutes subunit, $b_1$, $e_1$ and $h_1$ represents consumption of one cigarette smoked between the first and last cigarettes of the smoking minutes subunit, and $b_n$, $e_n$, and $h_n$, represent the number of cigarettes smoked between the first and last cigarettes of the smoking minutes subunit where n is any whole number greater than one (e.g., $b_2$=consumption of 2 cigarettes between the first and last cigarettes, or 4 total cigarettes during the smoking minutes subunit. The same definitions apply to FIG. 1B, the reduced-smoking period, indicated by the (').

FIGS. 3B and 3C illustrate that the cord (11) may lead to an electrical power source, thereby charging a battery within the device. The purpose of FIGS. 3A, 3B and 3C is merely to illustrate how device (1) may be configured to send and to receive data or electrical power.

In FIG. 4A, the case body (3) has two parts, the upper sleeve (15) and the lower case bottom (16) wherein the top of the case bottom is positioned adjacent to the top of the upper sleeve. In FIG. 4B, the case body (3) has two parts, the upper sleeve (15) and the lower case bottom (16) wherein the top of the case bottom is positioned downward within the sleeve to first detent (17), fixing the length of the case body to accommodate longer cigarettes. In FIG. 4C, the case body (3) has two parts, the upper sleeve (15) and the lower case bottom (16) wherein the top of the case bottom is positioned downward within the sleeve to second detent (18), fixing the length of the case body to accommodate even longer cigarettes. In FIGS. 4A–4C, the upper sleeve (15) of the case body (3) is hingedly attached to the lid (2).

DETAILED DESCRIPTION OF THE INVENTION

Figure 1A:
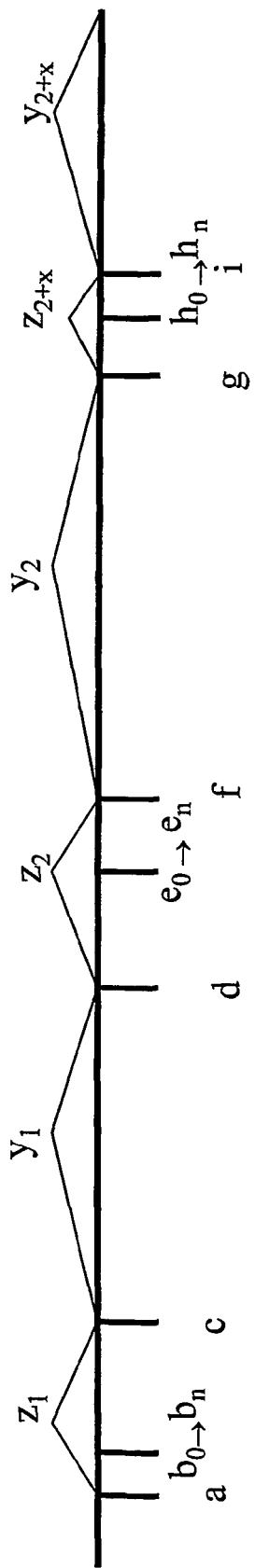
FIGS. 1A and 1B depict two time lines: a data collection period (FIG. 1A) and a reduced-smoking period (FIG. 1B).

The present invention is a method for decreasing the cigarette consumption of a smoker. This method aids a smoker desiring to reduce or eliminate his or her tobacco use. The method provides a scheduled smoking regimen which accounts for behavioral patterns of the individual smoker, preferably guiding a smoker to complete smoking cessation if possible, or to maintain a reduced smoking regimen. The method gradually reduces the number of cigarettes scheduled to the smoker and provides behavioral modification techniques to cope with withdrawal. It is to be understood herein that while the term "cigarette" is used, the method of the present invention can be used for other tobacco products and habit-forming substances.

The method comprises a first step of recording the smoker's habit over a data collection period. The data collection period is a unit of time sufficient for data to be generated that can be analyzed to describe the smoker's pattern of cigarette consumption over time. The data collection period is comprised of multiple consecutive units, wherein one unit is comprised of a set of smoking minutes subunit followed by a nonsmoking minutes subunit. Smoking minutes are the number of minutes in which the smoker can consume cigarettes. Smoking minutes begin when the smoker consumes a first cigarette after awaking and end when the smoker consumes a last cigarette before sleeping. Nonsmoking minutes, wherein a smoker is not smoking, comprise the remainder of the unit between when the last cigarette before sleeping was consumed and when the first cigarette after awaking is consumed. Preferably, the data collection period comprises at least 2 complete units, one of which includes the smolder's period of heaviest cigarette consumption per smoking minutes subunit. For example, if a smoker consumes more cigarettes on weekends than on weekdays, the data collection period should include at least one unit measured during a weekend. More preferably, the data collection period comprises at least 3 to 5 units. In a most preferred embodiment, the data collection period consists of 7 units.

During a smoker's smoking minutes, data are recorded about a smoker's cigarette consumption, or the act deemed equivalent to the recordal of cigarette consumption: the number of smoking minutes, the number of cigarettes consumed during a smoker's smoking minutes, the time of day at which the smoker's smoking minutes began (including the time of the smoker's first cigarette of the day), and the time of day at which the smoker's smoking minutes ended are collected. Additionally, other data may be collected, such as the time of day each cigarette is consumed.

At the end of the data collection period, a body of data has been collected that describes the smoker's cigarette consumption and behavior pattern over a predetermined number of units. In the method of the present invention, a customized schedule for reducing cigarette consumption is designed from analyzing said body of data. The analysis of said body of data is used to generate a smoking schedule for the smoker to follow during a subsequent first reduced-smoking period. The schedule prescribes a reduced number of cigarettes to be consumed throughout the smoker's smoking minutes on a regular time schedule. The time at which a cigarette is scheduled for consumption by the smoker during a reduced-smoking period is determined by a number of factors, including preferably: the time of day at which the smoker first consumed a cigarette during a corresponding set of smoking minutes of the data collection period, the number of smoking minutes during a corresponding unit of the data collection period, the number of cigarettes consumed during a corresponding unit of the data collection period, and the time of day at which the smoker last consumed a cigarette during a corresponding unit of the data collection period. The first reduced-smoking period is greater than one unit. In a preferred embodiment, the first reduced-smoking period consists of 3–5 units. In the most preferred embodiment, reduced-smoking period consists of 7 units. Other data collected maybe analyzed if desired, such as the time of day of each cigarette.

The time that the first cigarette was consumed in each data collection unit is preferably used to prescribe a schedule for consuming a first cigarette in said reduced-smoking period unit. A delay of from about five minutes to about 30 minutes per unit of said reduced-smoking period is provided for in the method of the present invention. For example, in the first unit of said reduced-smoking period, the first scheduled cigarette may be about five to thity minutes later than the average time of the first cigarette consumed in said data collection period. In the second unit of said reduced-smoking period, the first scheduled cigarette may be about five to thirty minutes later than the time of the first scheduled cigarette of said first unit of said reduced-smoking period. Alternatively, the first scheduled cigarette in the reduced-smoking period may be about five to thirty minutes later than the first cigarette of the day in the comparable day of the data collection period or the immediately preceding reduced-smoking period. In this example, if the smoker began his smoking in this data collection period at 6 a.m. on a Monday, he may be prescribed a smoking start time in the first reduced-smoking period Monday of 6:15 a.m. If the smoker is having compliance difficulties, the time of the first scheduled cigarette of the next unit or period may be adjusted so that compliance can be achieved. For example, instead of progressively moving the start time thirty minutes a day, the start time may be moved thirty minutes for the first unit and fifteen minutes or less for the second unit. This may be especially effective for nicotine-dependent smokers. Alternatively, the time for the first scheduled cigarette may not be readjusted until a second reduced-smoking period.

The behavior of the smoker in the first reduced-smoking period may either be continuously monitored, for example, by wireless or modem communication, or monitored after a first reduced-smoking period is completed either by the smoker or by a third party, such as a health professional. In such case, upon completion of the first reduced-smoking period, the smoker's compliance is evaluated. Consumption data from the first reduced-smoking period is then used to design a reduced smoking regimen for a second reduced-smoking period; in this case, the first reduced-smoking period essentially becomes the data collection period for the second reduced-smoking period. If the smoker complied with the reduced smoking regimen in the first reduced-smoking period, the second reduced smoking regimen will permit consumption of fewer cigarettes during a subsequent corresponding smoking minutes subunit. If the smoker did not comply with the reduced smoking regimen in the first reduced-smoking period, the second reduced smoking regimen may permit consumption of the same number or even more cigarettes during a subsequent corresponding smoking minutes subunit. Any number of additional reduced-smoking periods are scheduled until the smoker reaches the desired smoking reduction goal. If continuously monitored, as for example, when a device is used with communication capabilities, the schedule may be changed for each subsequent unit depending on compliance and behavior.

The amount of cigarette reduction between a first time period and a second subsequent time period (i.e., the data collection period and the first reduced-smoking period or between one reduced-smoking period and the next reduced-smoking period) is described numerically by a factor as a percentage. The goal amount of cigarette reduction in said second time period can be customized for the smoker and his or her past history, but is preferably sufficient to make the total reduction at least 50%. Thus, the goal in said second time period may range from about 10% to about 20% or more, depending on the total goal. The goal amount of cigarette reduction is preferably about 20–30% reduction based on the original amount consumed. A number of cigarettes to be consumed during smoking minutes during said second time period is determined by multiplying the number of cigarettes consumed during the corresponding set of smoking minutes during the first time period by the factor percentage of the goal amount of cigarette reduction. For example, if 40 cigarettes were consumed during the first set of smoking minutes of the first time period and the goal amount of cigarette reduction is 40% (0.4), then 24 cigarettes (reduction of 40 cigarettes×0.4=16 cigarettes) would be scheduled for consumption during the first set of smoking minutes during the second time period.

The following example is merely demonstrative of the method's data collection period as described and should not be considered limiting in any way. FIG. 1A represents a data collection period comprising three units, and time is represented by a straight line. A unit comprises the smoking minutes subunit and the nonsmoking minutes subunit, e.g., $z_1+y_1$. The times during the smoking minutes subunit at which cigarettes were consumed are noted as lowercase letters. In this example, letters a, d, and g represent the first cigarette consumed during each smoking minutes subunit. Letters c, f, and i represent the last cigarette consumed during each smoking minutes subunit. Letters $b_0 \rightarrow b_n$, $e_0 \rightarrow e_n$, and $h_0 \rightarrow h_n$ represent cigarettes consumed between the first and last smoking events of each unit where n is equal to a number indicating the total number of cigarettes consumed between the first and last cigarette of the smoking minutes subunit. If the total number of cigarettes consumed is two or less, then n is zero. The total number of cigarettes consumed during one unit is equal to n+2 if the total number of cigarettes consumed is 3 or greater. Smoking minutes, $z_1$, $z_2$, and $z_{2+x}$ are the time periods between the first and last cigarettes consumed of each unit, where x is one or greater. Smoking minutes are calculated by subtracting the time at which the last cigarette was consumed from the time at which the first cigarette was consumed. As an example, the smoking minutes of the first unit are equal to $c-a=z_1$. Nonsmoking minutes, $y_1$, $y_2$, and $y_{2+x}$ are the time periods between the last cigarette consumed of one unit and the first cigarette consumed of the next unit, where x is one or greater.

Figure 1B:
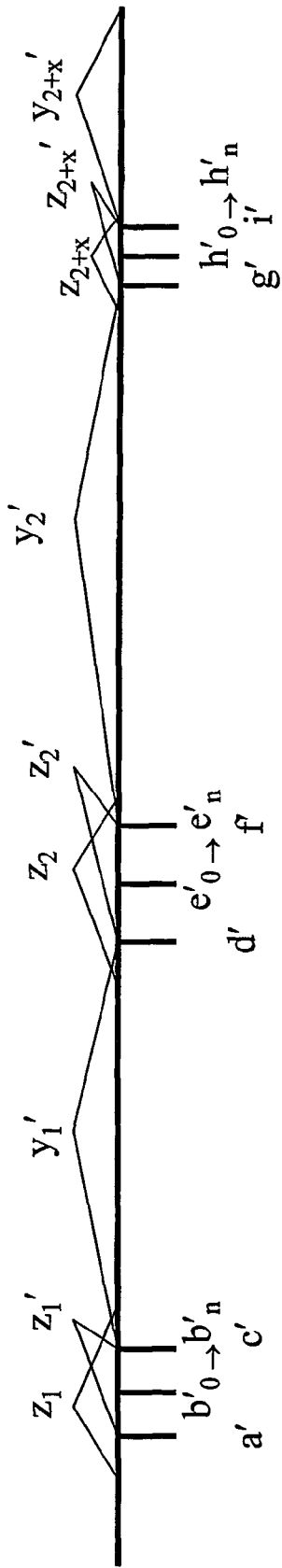

The following example of how the method may be employed during a reduced-smoking period is only meant to be demonstrative and not limiting in any way. In FIG. 1B, a reduced-smoking period of three units is depicted, wherein the straight line represents time. For illustrative purposes, the reduced-smoking period depicted in FIG. 1B immediately follows the data collection period of FIG. 1A; therefore, the units of the reduced-smoking period correspond to the units of the data collection period. In order to create the schedule of reduced cigarette consumption during the reduced-smoking period, the number of cigarettes consumed during the data collection period, n+2 in this example, and the length of the data collection period, $c-a=z_1$ in this example, must be known from a corresponding set of smoking minutes during a previous period (the data collection period in this example). For the sake of illustration, assume that $z_1$, the smoking minutes subunit, is equal to 960 minutes and during that time 40 cigarettes were consumed. If 40 total cigarettes were consumed, n=38. If the goal amount of cigarette reduction is 50% in this example, then the method will schedule 20 cigarettes to be consumed during the first set of smoking minutes of the reduced-smoking period (n(0.5)+1). The time interval between cigarette consumption during the smoking minutes of the first unit of the cigarette reduction period, or $z_1'$, is calculated by dividing $z_1$/20 cigarettes. Therefore, the time interval between consumed cigarettes during the first set of smoking minutes of the reduced-smoking period is 48 minutes. Because the method assumes that the set of smoking minutes during the first unit of the reduced-smoking period will be approximately the same length as the set of smoking minutes during the first unit of the data collection period, the method schedules first cigarette consumption (a') later in time than (a) was consumed and optionally the last cigarette consumption (c') earlier in time than (c) was consumed. If the smoker maintains this schedule, $z_1'$, the smoking minutes of the reduced-smoking period, will be smaller than $z_1$. Alternatively, the method schedules first cigarette consumption (a') later in time than (a) was consumed and the total number of smoking minutes is kept constant during $z_1$ and $z_1'$.

During the reduced-smoking period, the smoker consumes scheduled cigarettes but importantly, cigarettes are always available to the smoker without psychological penalty. When the smoker consumes cigarettes, scheduled or unscheduled, the method records the following information during the reduced-smoking period: the time of day at which the smoker first consumed a cigarette, the number of smoking minutes, the number of cigarettes consumed, and the time of day at which the smoker consumed the last cigarette.

After the end of each reduced-smoking period, the method generates a new schedule for reduced smoking consumption during the next reduced-smoking period based on the smoker's ability to maintain the reduced smoking schedule of the previous period. The cigarette consumption data of the reduced-smoking period, which may vary from the scheduled cigarette consumption program, are analyzed to determine a new schedule for reduced cigarette consumption. First, the number of cigarettes to be consumed during the next reduced-smoking period is determined by multiplying the factor percentage of desired decrease by the number of cigarettes consumed during the corresponding smoking minutes subunit of the previous period. The time of the first cigarette to be consumed in the reduced-smoking period is preferably determined by building a delay of about five to thirty minutes per unit into the methodology for said first cigarette of the day or in the corresponding unit of the reduced-smoking period compared to the data collection period or the immediately preceding reduced-smoking period. Next, the interval between scheduled cigarettes to be consumed is determined dividing the number of smoking minutes during the corresponding smoking minutes subunit of the previous period by the number of cigarettes to be consumed. It is possible that more cigarettes may be scheduled in a subsequent reduced-smoking period than were scheduled in a previous reduced-smoking period, but the number of cigarettes scheduled for consumption will always be lower than the number of consumed cigarettes during the previous period. Table I mathematically describes one embodiment of the formulas derived to prescribed smoking regimens and should not be considered limiting in any way.

TABLE 1

Mathematical Descriptions of Smoking Reduction Regimens for 21 units

| Unit[a] | Number Prescribed Cigarettes |
|---|---|
| $U_1$ | $n_1$[b] recorded, no scheduled |
| $U_2$ | $n_2$ recorded, no scheduled |
| $U_3$ | $n_3$ recorded, no scheduled |
| $U_4$ | $n_4$ recorded, no scheduled |
| $U_5$ | $n_5$ recorded, no scheduled |
| $U_6$ | $n_6$ recorded, no scheduled |
| $U_7$ | $n_7$ recorded, no scheduled |
| $U_8$ | $0.5(n_1)$ scheduled $n_8$ recorded |
| $U_9$ | $0.5(n_2)$ scheduled $n_9$ recorded |
| $U_{10}$ | $0.5(n_3)$ scheduled $n_{10}$ recorded |
| $U_{11}$ | $n_8$ scheduled $n_{11}$ recorded |
| $U_{12}$ | $n_9$ scheduled $n_{12}$ recorded |
| $U_{13}$ | $n_{10}$ scheduled $n_{13}$ recorded |
| $U_{14}$ | $n_{11}$ scheduled $n_{14}$ recorded |
| $U_{15}$ | $0.5(n_8)(C_{8-10})$[c] scheduled $n_{15}$ recorded |
| $U_{16}$ | $0.5(n_9)(C_{8-10})$ scheduled $n_{16}$ recorded |
| $U_{17}$ | $0.5(n_{10})(C_{8-10})$ scheduled $n_{17}$ recorded |
| $U_{18}$ | $n_{15}$ scheduled $n_{18}$ recorded |
| $U_{19}$ | $n_{16}$ scheduled $n_{19}$ recorded |
| $U_{20}$ | $n_{17}$ scheduled $n_{20}$ recorded |
| $U_{21}$ | $n_{17}$ scheduled $n_{21}$ recorded |

[a]$U_x$ is the unit comprised of smoking and nonsmoking minutes.
[b]$n_x$ is the number of lid openings where the method is implemented by the cigarette case.
[c]$C_x$ is the compliance rate calculated by dividing the actual number of lid openings by the number of prescribed lid openings.

The end of the reduced smoking regimen resulting in complete cessation proceeds in the following way. When the smoker can maintain a schedule of minimal cigarette consumption, the method schedules only one cigarette. In a preferred embodiment, when the smoker is scheduled to consume three cigarettes throughout one smoking minutes subunit and is able to maintain that schedule for one unit, the method generates a new schedule for the following smoking minutes subunit for consuming only two cigarettes. When the smoker can maintain the two-cigarette schedule for one unit, the method generates a new schedule for the following smoking minutes subunit for consuming only one cigarette. When the smoker can maintain the one-cigarette schedule for one unit, no further cigarettes are scheduled and the smoker has successfully completed the regimen.

The method of the present invention never increases the interval between cigarettes scheduled for consumption when the smoker has difficulty complying. For this reason, the method is flexible enough to keep even a refractory smoker progressing towards cigarette reduction and elimination. Likewise, if a smoker does not consume scheduled cigarettes, the method is able to increase the interval between scheduled cigarettes for consumption. Because this method is flexible and not punitive, smokers are more likely to continue to work with the method to reduce their consumption instead of abandoning the method. This method provides advantages over ones which do not continuously adjust the smoking schedule according to smoker performance. A method not flexible enough to adjust to changes in an individual's smoking habit is likely to result in a lack of compliance and an unrealized goal of smoking reduction or cessation.

At the very minimum, the method of the present invention may be implemented by the smoker wherein the smoker collects data describing his or her smoking habit as described previously, calculates the reduced smoking schedule according to the equation, smokes cigarettes according to the calculated schedule, and notes cigarette consumption for calculating the next reduced smoking schedule. However, the minimum implementation of the method is very cumbersome and for this reason, the preferred implementation of the method of the present invention is by any device which is capable of recording cigarette consumption passively or actively and of signaling to the smoker when a cigarette is scheduled for consumption. The method of the present invention may be contained entirely within the memory of a device that implements the method, or the device may be able to communicate remotely to send and receive data. The most preferred device to implement the method of the present invention is a device with memory and display means enclosing a supply of cigarettes, such that when a cigarette is removed from the device a cigarette is counted as consumed, wherein the device may or may not have a wireless means to communicate data remotely. A preferred device has a body and lid proportioned to contain a box of cigarettes, much like a cigarette case. When a smoker changes the cigarette case lid from a first closed position to a second opened position, a sensor is actuated, signaling cigarette consumption in the preferred device. The cigarette case has memory, display, and optionally, communication means. Electronic means in the device records the smoker's cigarette consumption, provides a schedule for reduced cigarette consumption, and communicates a signal when cigarette consumption is scheduled. Where communication means is included in the cigarette case, the device is able to send and receive data.

Figure 2:
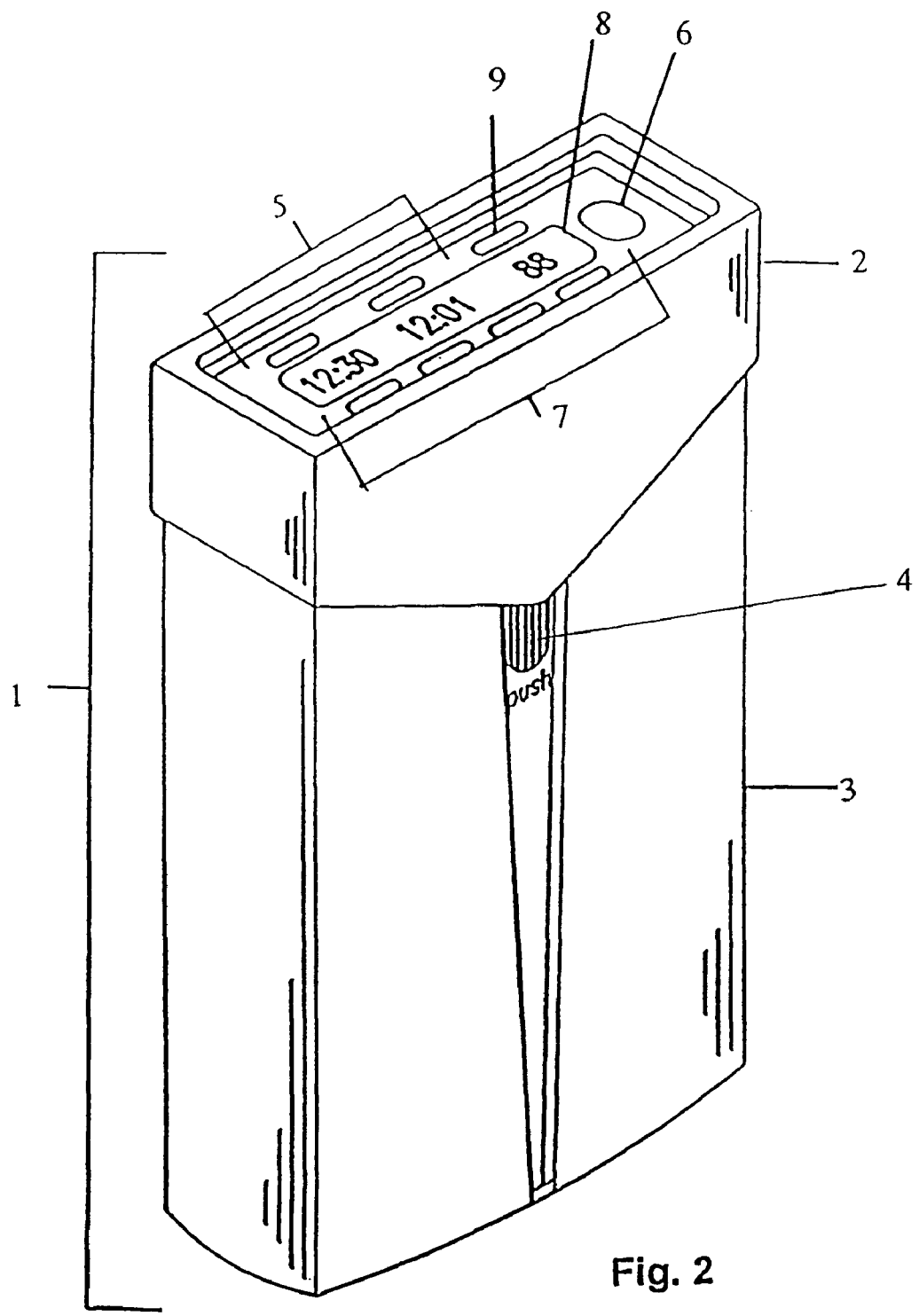
FIG. 2 is a perspective depiction of a device useful for implementing the method of the present invention. As depicted, the device (1) may contain a package of cigarettes or other tobacco products. The device is comprised of the case body (3), which houses the cigarettes, and the lid (2) which is hingedly attached to the case body (3). When the latch release button (4) is depressed, the lid (2) moves from a closed position to an open position. The device may have buttons (5) to operate processing components to input information and control communication means. Optionally, the device can have user input buttons (7) useful for inputting information or controlling communication means. Audible communication is emitted from speaker (6). Liquid crystal display (LCD) (8) communicates alphanumeric data to the smoker, an example of which may be the time of day or the time until the next scheduled cigarette. Light emitting device (LED) (9) communicates visually to the smoker, for example, at the time a cigarette is scheduled.
Figure 3A:
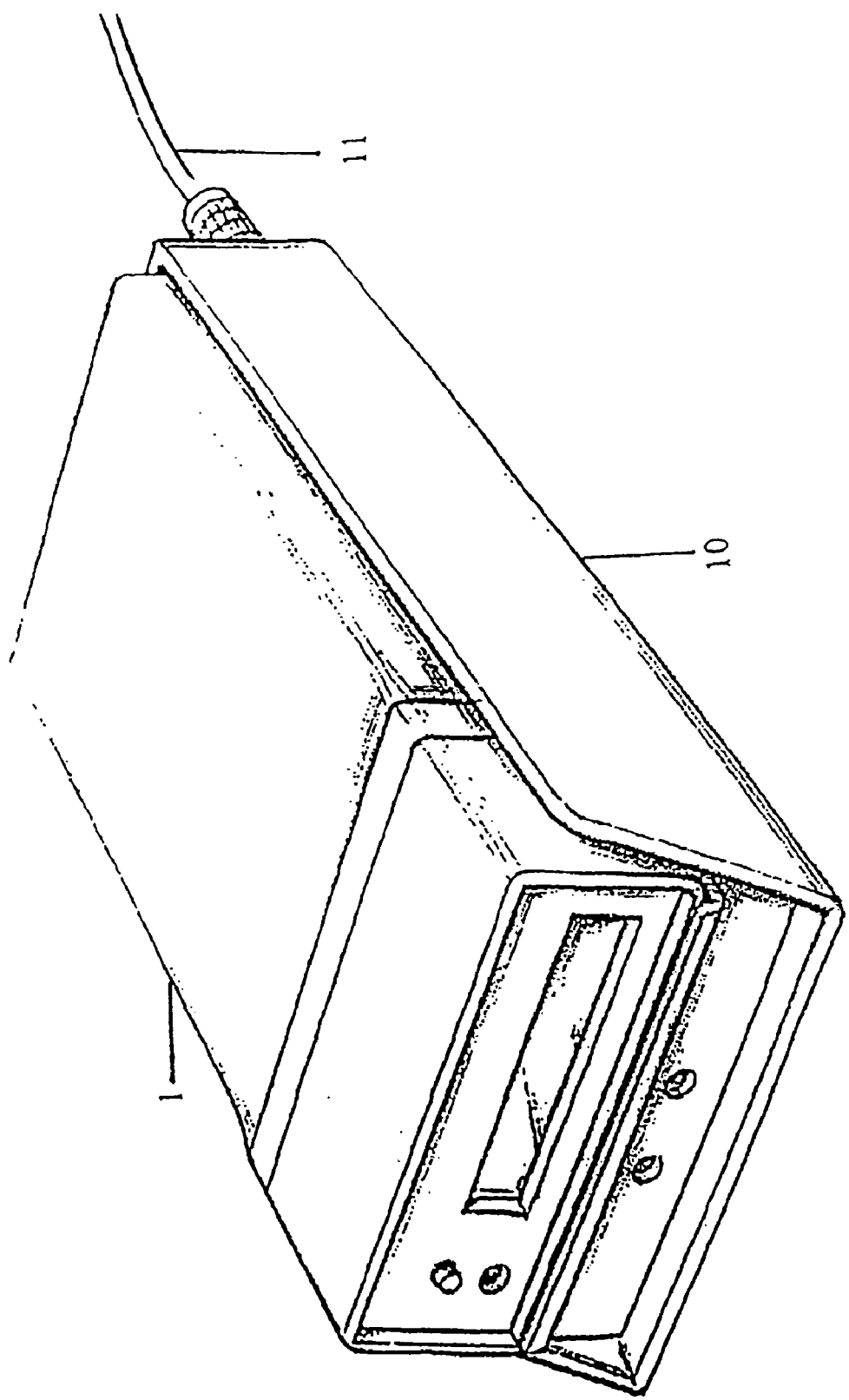
FIG. 3A is a perspective depiction of a device able to implement the method of the present invention placed in a cradle with a cord leading from the cradle. The device (1) may incubate in the cradle (10) to receive or send data from a remote source transmitted through the cord (11). The cord (11) may lead to a computer, whereby data is transmitted to and from the computer. The cord (11) may lead to a telephone outlet, whereby data is transmitted to and from a remote site. Alternatively, the cord (11) may lead to an electrical power source, thereby charging a battery within the device (1).
Figure 3C:
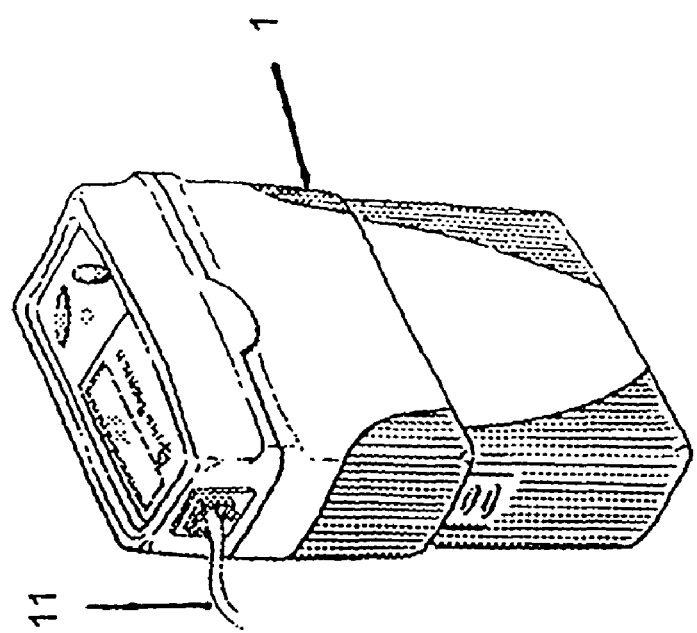
FIGS. 3B and 3C are perspective depictions of a device able to implement the method of the present invention without a cradle, with instead a cord leading directly from the device. The cord (11) may lead to a computer, whereby data is transmitted to and from the computer. The cord (11) may lead to a telephone outlet, whereby data is transmitted to and from a remote site. Alternatively.
Figure 3B:
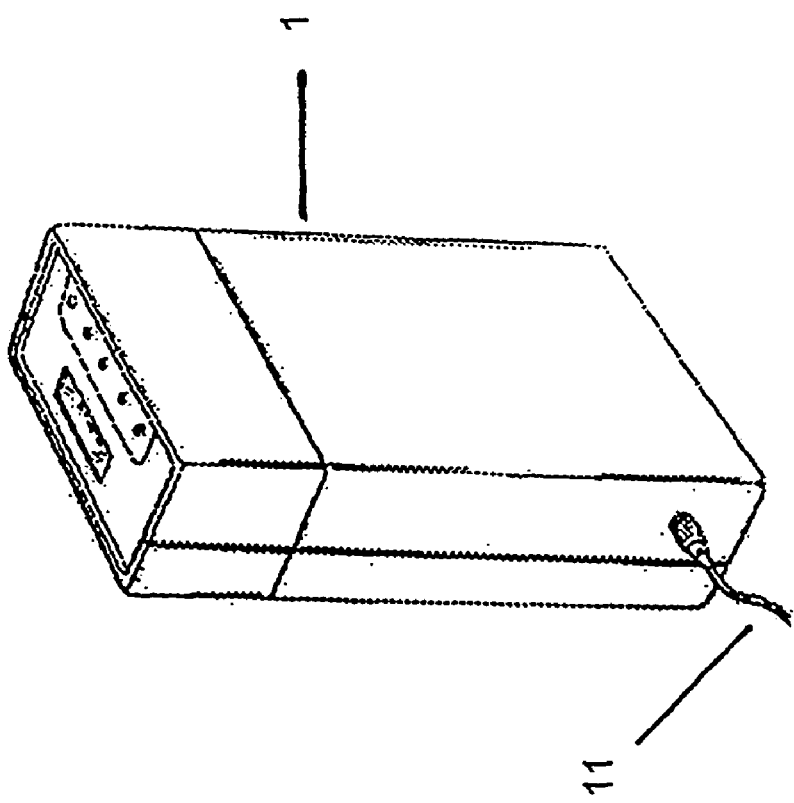

One such device is described in U.S. application Ser. No. 09/782,592 filed Feb. 12, 2001, which is herein incorporated by reference. The device implements the method of the present invention through the user's activity. Upon engaging in the normal activity of removing an article from the device, the act of opening the lid is detected by a lid-opening sensor which then sends a signal to a data collection unit contained in the device which is capable of collecting and storing data A preferred embodiment of the device useful in the present invention is depicted in FIG. 2, which is generically a habit cessation device (1) comprising a case body (3) and a lid (2), shown in a closed position. A latch release button (4) is provided which allows a user to move lid (2) from a first closed position to a second opened position to gain access to the interior of the case body (3) and to activate a sensor. Case body (3) is adapted to hold a package of cigarettes, being configured as a cigarette case. User input buttons (7) may optionally be provided so that the user may program certain data into the device. Although the number of user input interface buttons (7) malt vary depending on the needs of the user and the regimen employed by the user, the data collection unit may be programmed to collect additional behavioral data depending on which user input button (7) is actuated by the user. In another embodiment, no user input buttons are provided on the device. The device can be provided with buttons (5) which permit the user to set the time of day, to reset the device, to control any sound which the device may emit, to undo a mistaken operation, to scroll through a menu of controllable options, or to backlight the LCD display (8). The device useful in the present invention may possess means to communicate with the smoker. One such communication means is a light emitting device (LED) (9) which may visually signal when the smoker is scheduled to open the lid (2) to gain access to the cigarettes inside the case body (3). Another communication means is the Liquid Crystal Display (LCD) display (8), which preferably provides information to the user such as the current time of day, the time remaining until the next cigarette can be consumed, and the number of cigarettes smoked per day. The LCD display (8) is activated by initiating current or by pushing a button (5). Yet another communication means possessed preferably by the device is a speaker (6) which may emit an audible signal when the smoker is scheduled to open the case to consume a cigarette. In the case of a device provided with speaker (6), it is most preferred that one of buttons (5) controls the volume of the audible signal or may suppress the sound. It is contemplated that vibrating means may be incorporated into the device to further communicate with the smoker when the speaker (6) is silenced with one of the buttons (5). The device may be powered by at least one battery such as standard 1.5 volt (e.g, AA or AAA alkaline batteries) or any alternative power source capable of providing sufficient power to the data collection unit. The device can be rechargeable by connecting to an electrical outlet. FIG. 3A depicts one embodiment of the device (1) in cradle (10) with cord (11) which represents a configuration for a rechargeable device if the cord (11) leads to an electrical outlet. FIG. 3B and FIG. 3C depict embodiments wherein the device is recharged by a cord connected directly to the device itself.

In yet another embodiment, the preferred device useful in the present invention has communication means by which data can be sent to and received from a remote site. Any technology that facilitates sending and receiving data is contemplated for incorporation into this method. The following embodiments are for illustrative purposes only and are not meant to limit the invention in any way. The communication means may be wireless, taking advantage of cellular or digital technology. Using this means, data can be transferred immediately to a remote source. Alternatively, data can be stored for a period of time and then transferred to a remote source via wireless communications means. The communication means can be via a telephone jack embedded in a cradle (10) with a cord (11) which is plugged into a portal for transmitting data, such as a phone line or a computer, as depicted in FIG. 3A. Also, the communication means can be via a telephone jack embedded in the electronic components to which a phone line can be connected for direct transmission, as depicted in FIG. 3B or 3C. Of the device requiring a wire, cord or cable for two-way data transmission, it is envisioned that data would only periodically need to be sent and received so that most of the time the device is detached from the wire, cord, or cable and portable. Thirdly, the communication means can be a direct hook-up to a computer wherein data from the device is transferred to the computer for downloading to the remote site. The direct hook-up may be through a cord (11) electronically connected to the device (1) through either a port in the device itself (FIG. 3A or 3B) or in a cradle (10) (FIG. 3A). Utilizing this variety of communication means, data can be transferred periodically. The device can be powered with a portable energy source such as a battery, or alternatively be rechargeable by connecting to an electrical outlet. The embodiment depicted in FIG. 3A of the device (1) in cradle (10) with cord (11) could represent a configuration for a rechargeable device if the cord (11) leads to an electrical outlet. The embodiments depicted in FIGS. 3B and 3C of the device (1) with cord (11) could represent a configuration for a rechargeable device if the cord (11) leads to an electrical outlet.

Figure 4C:
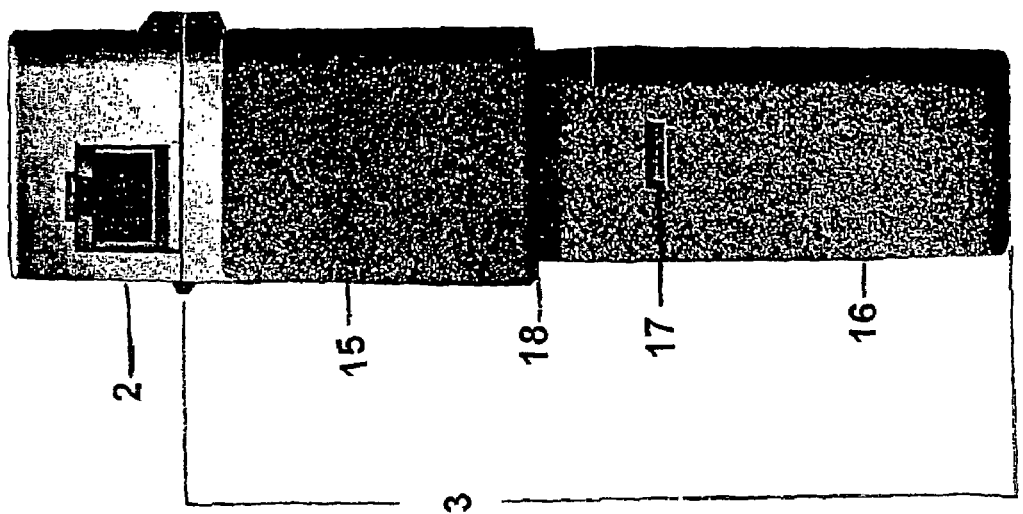
FIGS. 4A, 4B and 4C depict variable positions of a device configuration with a telescoping case body.
Figure 4B:
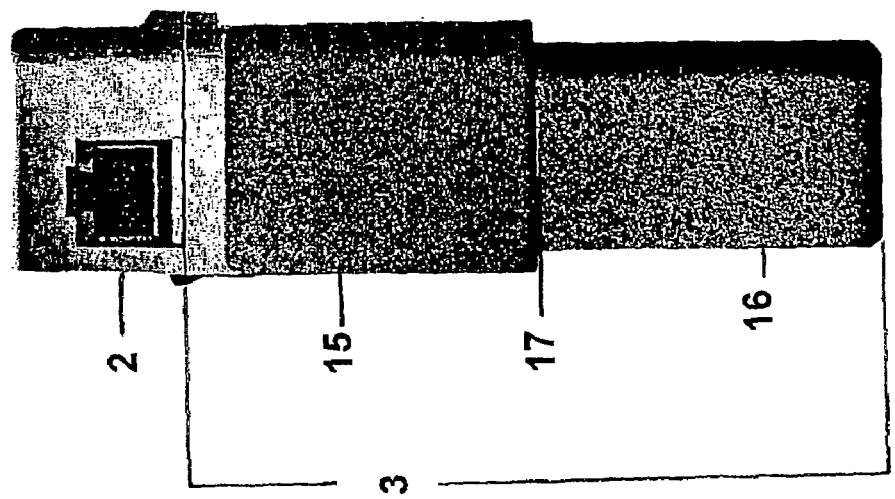
Figure 4A:
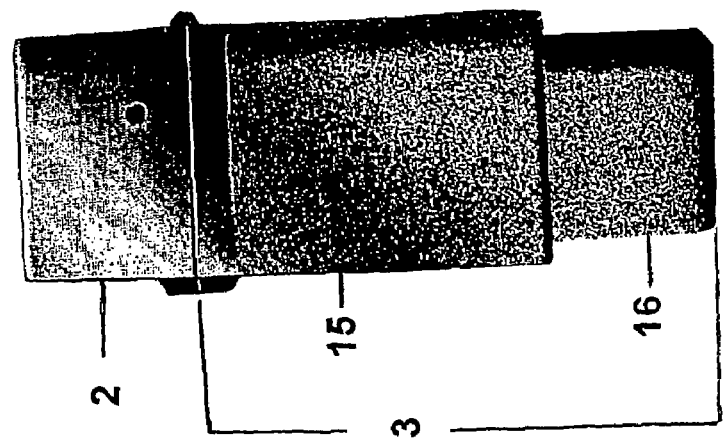

One preferred configuration for such a device useful in implementing the cigarette smoking reduction method of the present invention is depicted in FIGS. 4A, 4B and 4C. As shown in FIG. 4C, the device is preferably approximately 140 mm tall (20 mm taller than a 120 mm pack of cigarettes) but otherwise form-fitting to the shape of the cigarette pack. The upper 20 mm of the device is composed of plastic (preferably ABS plastic), including a lid (2) which houses the electronic components necessary to carry out the method of the present invention and a rigid lip on the case body surrounding the lower compartment to provide structure and support for the lid-closing latch mechanism (4) and sensor. The lower portion of the case body is fabricated in two sections: (i) an upper sleeve (15) of plastic about 34 mm long which hingedly connects to the lid (2) and contains the latch (4) which opens the lid and (ii) a case bottom (16) about 84 mm long sliding inside the plastic upper sleeve (15). When the case bottom (16) is pushed fully such that its top is adjacent to the top of the upper sleeve (15), the device yields the minimal length of open space inside the case bottom at preferably about 84 mm as shown in Fig. A. When the case bottom (16) is moved downward within the upper sleeve (15), creating a telescoping effect, it can be stopped at a first detent (17), fixing the length of open space inside the case bottom at preferably about 100 mm, a preferred setting for housing cigarettes 100 mm long as shown in FIG. 4B. When the case bottom (16) is moved downward to a second detent (18), the length of open space inside the case bottom (16) is adjusted to about 120 mm, a preferred setting for housing cigarettes 120 mm long as shown in FIG. 4C. Another preferred configuration has a case body (3) fabricated in a neoprene or Spandex-type fabric which will shrink in size as cigarettes are removed but has sufficient fabric density to provide crush-resistance.

The method of the present invention is preferably implemented by a device which passively records cigarette consumption. However, if a smoker is willing to actively record his or her cigarette consumption, other devices may be employed to implement the method of the invention. A device appropriate for implementing the method of the present invention is any programmable device capable of receiving input from the smoker and communicating information to the smoker. The device may be capable of two-way data transmission or contain the method entirely within the device. Internet phones and other mobile phones, two-way pagers, wireless modems, and personal digital assistants (PDAs) handheld computers may all be programmed to implement a reduced smoking regimen. This application specifically contemplates software written for any personal electronic device based on the method described herein for reducing cigarette consumption by a smoker.

There are differing aspects to using passive and active devices to implement the reduced smoking method described herein. Passive devices such as the cigarette case described herein records cigarette consumption without direct input from the smoker. Alternatively, active devices require the smoker to directly record cigarette consumption.

Each type of device has its merits for different kinds of smokers. Some smokers may be more successful at reducing cigarette consumption by using a device such as the cigarette case described herein to implement the method, which passively records cigarette consumption. Because the cigarette case passively records the actions of the smoker, the smoker can concentrate on practicing coping mechanisms during times of abstinence and freely enjoying his or her scheduled cigarette consumption free from concern of having to interact with the device. On the other hand, some smokers may be more successful by participating actively in the cigarette reduction regimen. Because the smoker is required to record his or her cigarette consumption by interacting with an active device, the smoker is very aware of his or her actions, which may lead to altered smoking behavior because of that awareness. Despite the smoker interacting with the passive or active device in different ways, the information recorded by both means is being used the same way for the same purpose.

Where the method to reduce cigarette consumption is implemented by a device with communications means, it is contemplated that the remote source for data collection and distribution offers direct feedback to smokers using the method. Examples of direct feedback that may be offered electronically, through written documentation or personal counseling include but are not limited to tips for coping with withdrawal symptoms, graphs demonstrating the smoker's progress, timelines showing the smoker when the last cigarette will be scheduled based on the current rate of reduction, and calculations predicting the health and economic benefits of reduced smoking.

Figure 5:
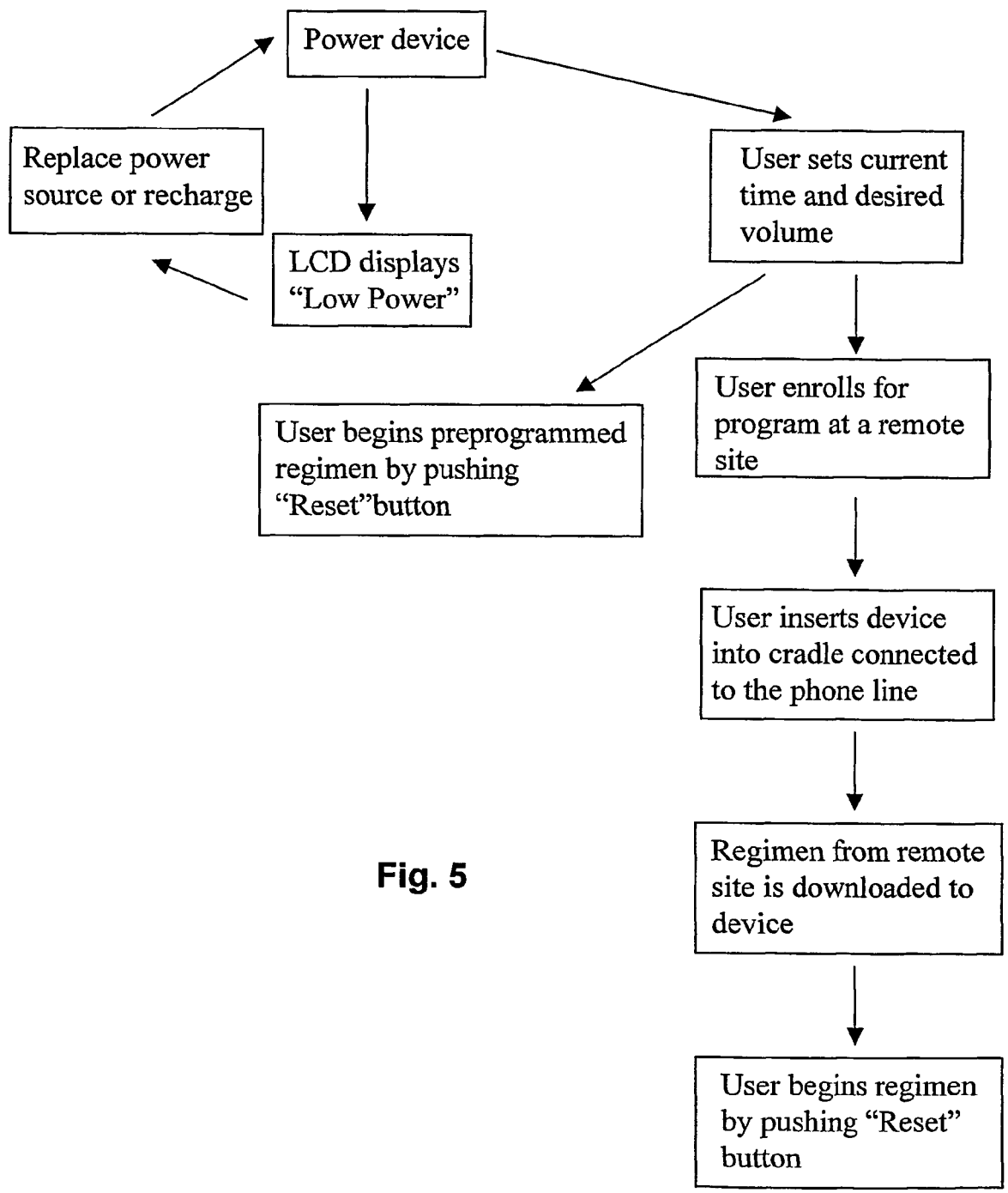
FIG. 5 is a flow chart demonstrating how the method of the present invention is initiated on a device preferably used in the present invention.

Flow charts describing how a device implements the reduced smoking method of the current invention are provided in FIGS. 5–8, and are meant to be illustrative but not limiting. FIG. 5 demonstrates how two different embodiments of the preferred device in the present invention are initiated. One of the embodiments is capable of two-way data transmission, whereas the other embodiment contains a preprogrammed method. The smoker first powers the device, which may include inserting batteries into the device or charging the device from an electrical power source. If, when the device is powered, the LCD indicates "Low Power," the smoker replaces the batteries or recharges the device. If, at any time during use, the device communicates to the smoker on the LCD that it has "Low Power," the batteries can be replaced or the device recharged without losing the acquired information or needing to restart the method. The smoker sets the current time and the desired volume for the audible cue that indicates a cigarette is scheduled for consumption. The volume can be adjusted at any time during operation. When the smoker depresses the "Reset" button of the preprogrammed device, it begins to record the smoker's cigarette consumption. If the device is capable of two-way data transmission, the smoker enrolls in a program by contacting a remote site. Information that the smoker provides to the remote site includes identifying the device so that the device and remote site can exchange data. Other information that the smoker may provide to the remote site may include personal contact information and his or her history of cigarette consumption. When the smoker depresses the "Reset" button, the program to record the smoker's cigarette intake is activated.

Figure 6:
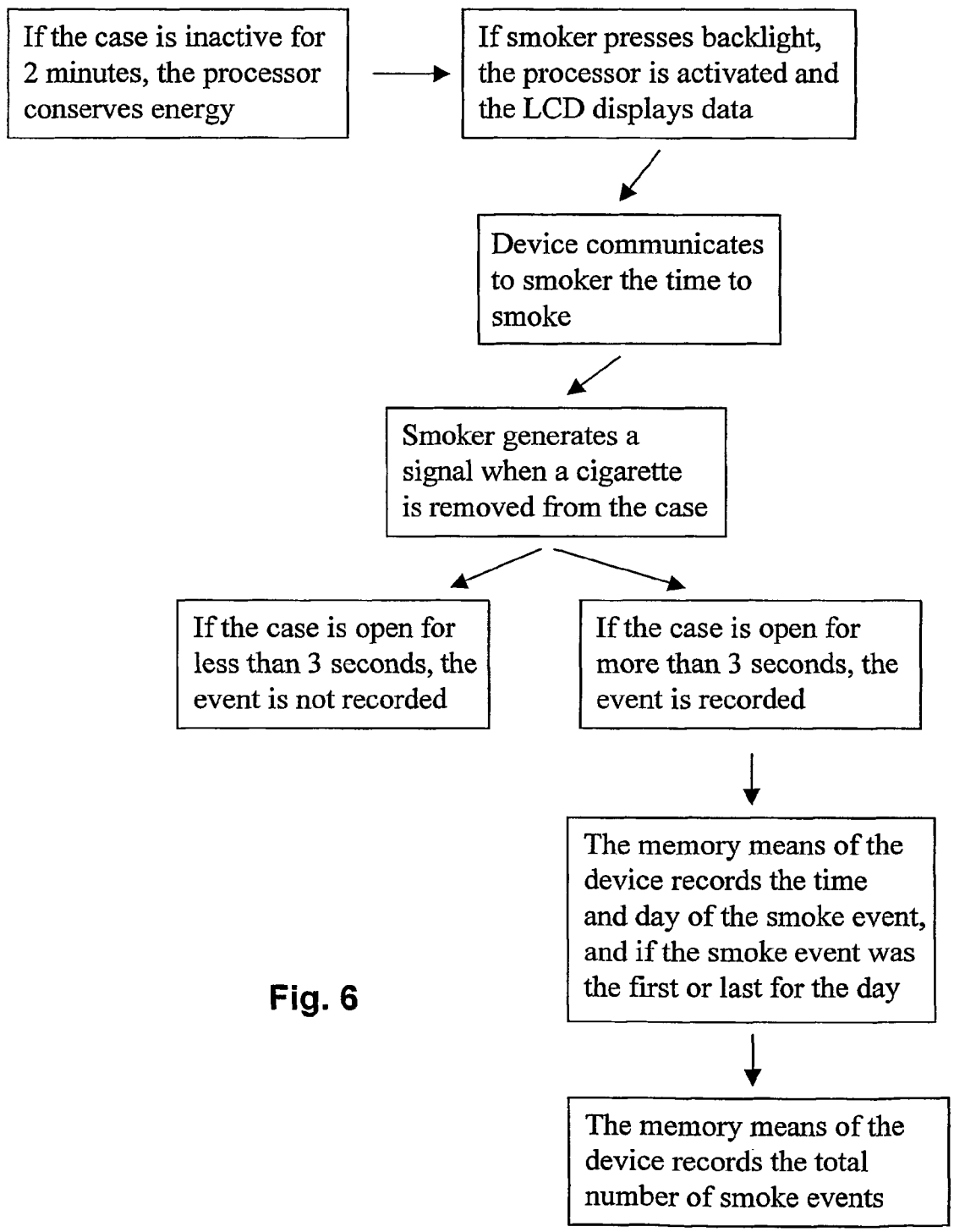
FIG. 6 is a flow chart depicting the operating activity of the preferred device.

FIG. 6 illustrates how any embodiment of the device described herein actuates the method of the present invention. The device has two modes to conserve energy: active and inactive. If the device is inactive for a predetermined brief period of time, it enters the inactive mode to conserve energy. The device is activated from its inactive mode by pressing a designated button. Other methods of activating the device include opening the device or in other ways actuating electrical current through the device, as is the case when the inactive device communicates to the smoker that a cigarette is scheduled for consumption. When the smoker opens the lid to the cigarette case, sensors are activated. If the device is opened for less than three seconds, the lid-opening event is not recorded. Conversely, if the lid is open for more than three seconds, the lid-opening event is recorded. By establishing a minimum length of time for which the device is open before recording the event, the device minimizes background lid-opening events. There are legitimate reasons why a lid-opening event should not be recorded: the lid-opening may have been an accident, the smoker may have needed to insert a new package of cigarettes, the smoker may have demonstrated the device, etc. For this reason, if the device was open for more than three seconds but a cigarette was not removed, the smoker can press an "undo" button so that the event will not be recorded. When the lid-opening event is recorded by the memory means of the device, data for each cigarette consumed is recorded.

Figure 7:
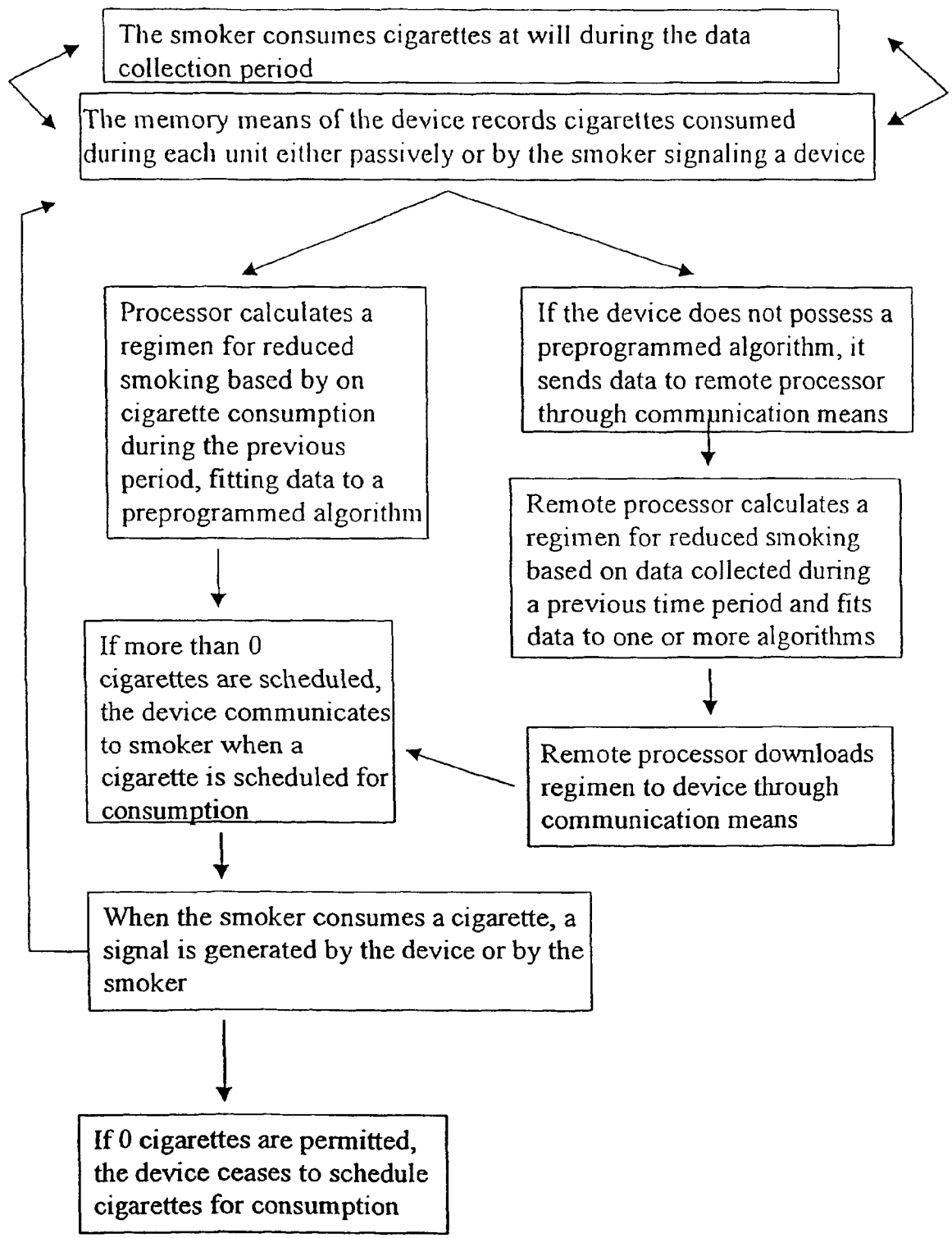
FIG. 7 is a flour chart depicting the reduced smoking method as it is implemented by an active or passive device.

FIG. 7 demonstrates how the smoking reduction method is implemented by a preprogrammed device or alternatively, a device capable of two-way data transmission. If the device is passive, the memory means of the device records the following data about each cigarette consumed: the number of smoking minutes, the number of cigarettes consumed during a smoker's smoking minutes, the time of day at which the smoker's smoking minutes began, and the time of day at which the smoker's smoking minutes ended. If the device requires the smoker to actively record each cigarette consumed, the smoker signals the device (for example, by depressing a button on the device) at which point the memory means of the device records the same data. At the end of the data collection period, the passive device calculates a reduced smoking regimen from a preprogrammed algorithm within its processing means. If the device does not have a preprogrammed algorithm within its processing means, the device may have means to send and receive data about his or her smoking habit. At a remote site, a reduced smoking regimen is generated which is then sent back to the device. In both devices, communication means signal to the smoker when a cigarette is scheduled for consumption. When a cigarette is consumed, scheduled or unscheduled, the passive device records the consumption. When a cigarette is consumed by a smoker using an active device to implement the method, scheduled or unscheduled, the smoker must record the consumption by signaling to the device (for example, by depressing a button).

Figure 8:
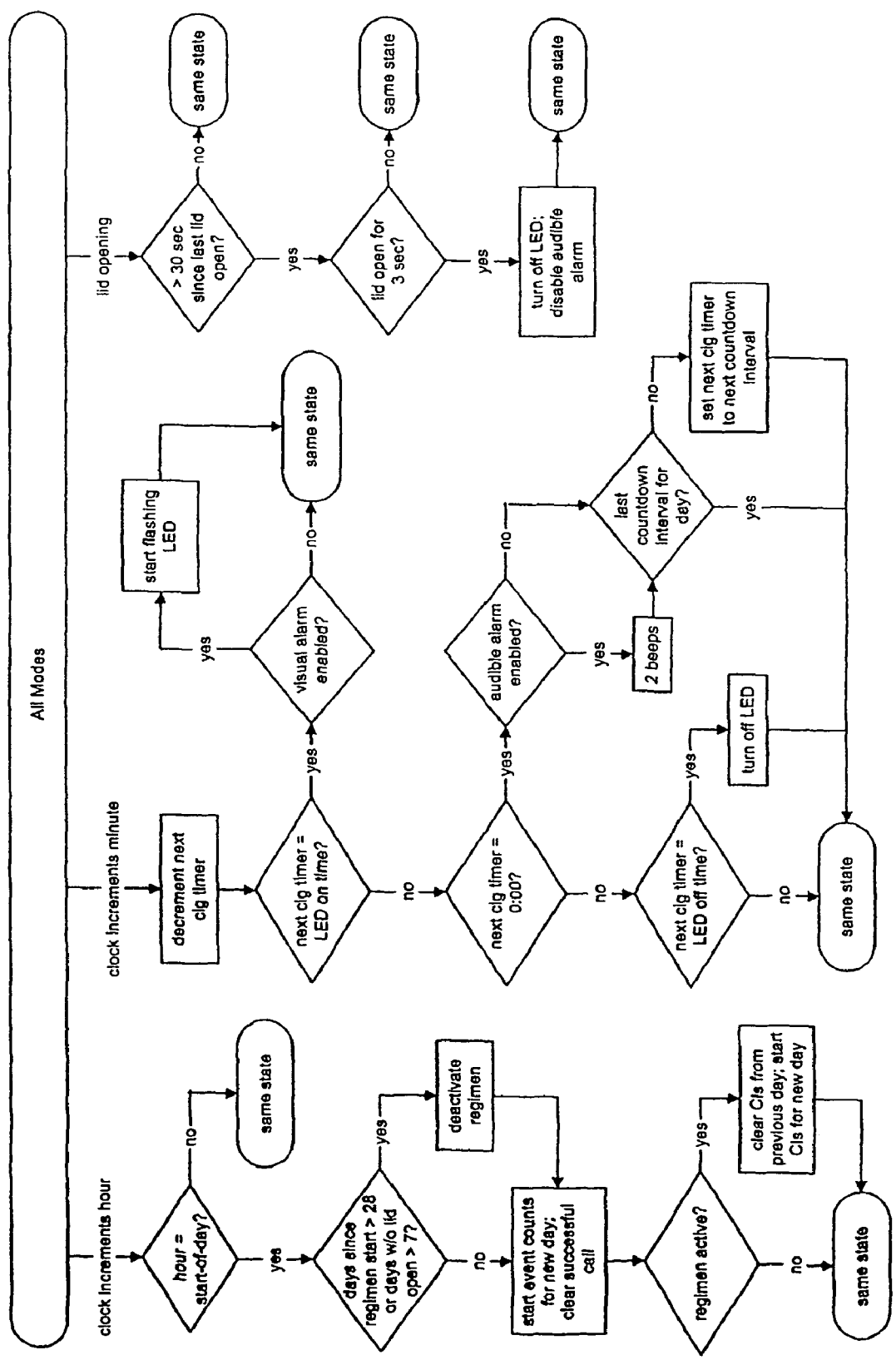
FIG. 8 is a flow chart depicting the regimen management implemented by a preferred theoretical device. The flow chart indicates responses of the device to inputs or internal timing events in various device states.

FIG. 8 is a flow chart that depicts an exemplary smoking reduction regimen management system implemented by a device. As indicated, the device records the time of day (i.e., "start of day?"), activates the regimen, indicates the time until the next cigarette consumption event, optionally utilizes flashing LED and/or audible alarm to signal a scheduled cigarette consumption event, and records lid opening events.

Figure 9:
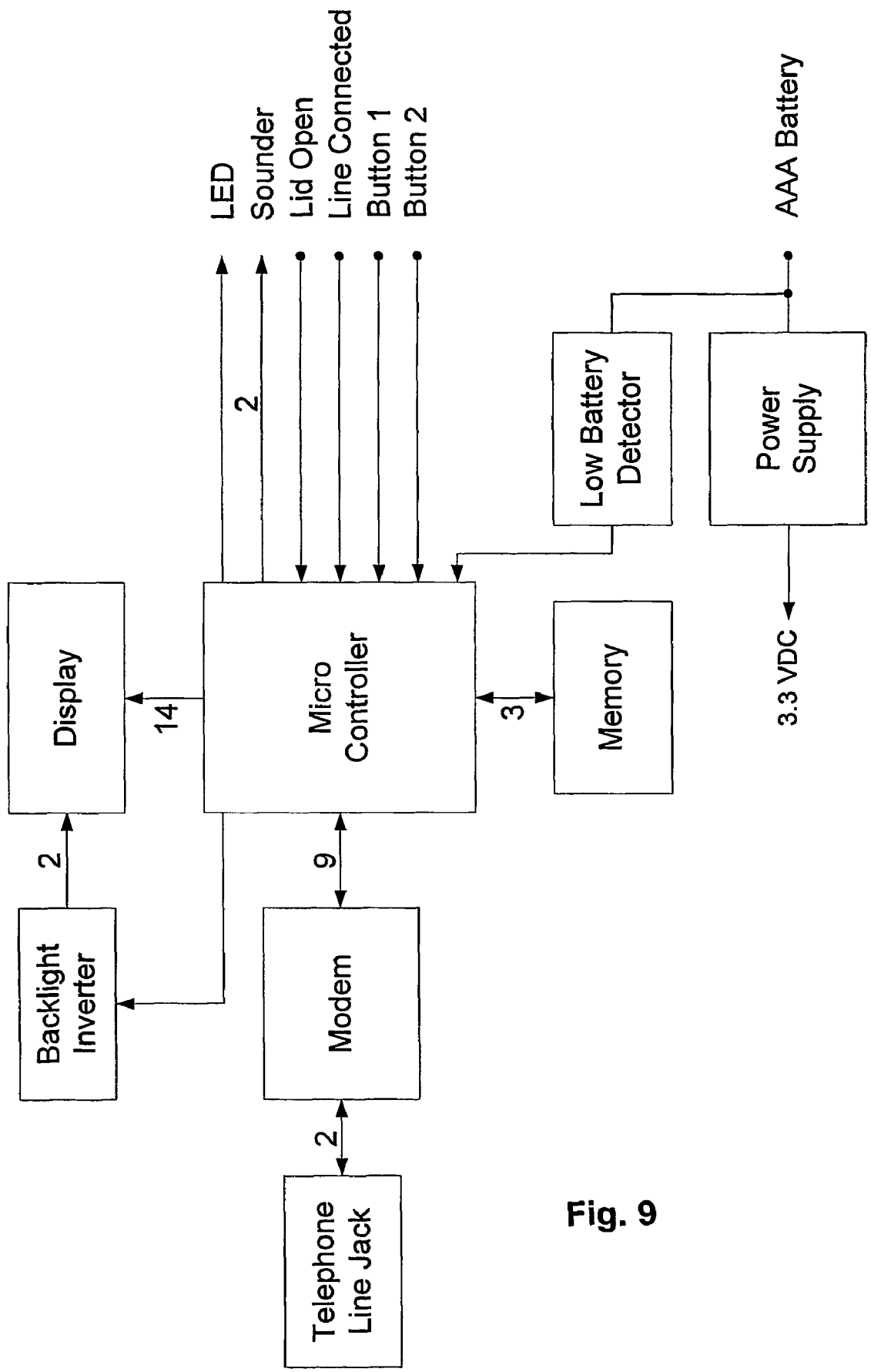
FIG. 9 is an electrical diagram of a device useful in implementing the method of the present invention.

FIG. 9 is an exemplary electrical diagram illustrating components of a device useful in implementing the method of the present invention. A micro controller is used to control a display means, a communications means, and a recording means.

In a preferred embodiment of a device useful in managing the method of the present invention, components in the lid comprise an 8-bit or 16-bit processor, flash memory, a circuit board, a modem, an LCD display, an LED light, a Piezo audio signal, a backlight and corresponding button, a volume control button, a recessed pin-point button for implementing a cessation program, a lid latch with sensors, and a battery. The device is programmed with a software protocol that has four stages: a baseline smoking profile development stage, a gradual reduction stage, a maintenance stage, and an optional cessation stage. For each day of the baseline stage, the device records every time the lid is opened, thus recording the total number of cigarettes smoked during the day and providing the length of the "smoking day" defined as the time difference between the first and last cigarettes smoked. After the baseline stage, the software institutes a reduction protocol, wherein a reduced number of cigarettes are scheduled to be dispensed at regular intervals beginning and ending at the same time of day as the start and stop time for the same day of the week during baseline. Signaling the smoker at a prescribed time occurs through both visible blinking lights and audible tones. The LED light begins blinking for 7.5% of the interval length prior to 00:00, the interval end, and continues for another 7.5% unless the lid is opened. For example, if intervals are scheduled 60 minutes apart, the light begins to blink 4.5 minutes (7.5% of 60 minutes) prior to 00:00. At 00:00, two quick beeps occur to notify the smoker that the interval is ending. If the smoker does not retrieve a cigarette, the light continues to blink for 4.5 minutes following 00:00, visually reminding the smoker of the interval end. If the smoker cannot smoke on schedule, the smoker is informed to smoke as soon as possible after the interval in order to maintain nicotine tapering rates and the prescribed interval lengths. Additionally, the LCD crystal will constantly display countdown time to the next cigarette. When an interval ends at 00:00, a new one will start, and the countdown to the next cigarette begins again, regardless of whether the lid is opened. In both conditions, the cumulative number of lid openings for the day is also continuously displayed. Once the scheduled reduction stage is successfully completed, the maintenance stage begins wherein a target number of cigarettes is scheduled. The software protocol calculates seven-day moving averages; when the averages diminish below the target number and are consistently lower than the prior week, the software adjusts the number of scheduled cigarettes to the lower amount. If the moving average goes upward, the software adjusts the number of scheduled cigarettes to the higher amount. However, while the software permits a smoker to move up and down within the range of no cigarettes to the target number, it does not schedule cigarettes above the target number. If the smoker wishes to actually quit smoking, the smoker can depress a recessed pin-point button for implementing a cessation program or continue to follow the smoking reduction regimen to zero scheduled cigarettes. In an alternative embodiment, the device also has an RJ-11 jack that is plugged into a standard RJ-11 outlet at any time to permit the device to download the stored smoking history to an appropriate server from which the data can be retrieved for subsequent evaluation and adjustments to the reduction schedule can be made and forwarded to the device.

While the method of the present invention has been described for reducing cigarette consumption, it is contemplated that this method can be implemented to reduce the consumption or use of other habit-forming substances such as cigars, smokeless tobacco, foods, pharmaceutics and the like.

EXAMPLE 1

Smoking Reduction Study

A smoking reduction study was conducted which employed scheduled reduction techniques according to the present invention.

Subjects were recruited for the smoking reduction study through newspaper and radio advertisements using the following criteria: 18 years or older; having a minimum of a two year smoking history; consuming at least 15 cigarettes per day; undergoing no current cessation treatment; and experiencing no untreated systemic illnesses. An initial base of 47 subjects were enrolled in the program. The average age of the participants was 43 years. The average years of smoking was 25 years. The reported mean number of cigarettes consumed per day was 25.2 cigarettes.

Baseline assessment was completed during the initial orientation session. Along with demographic and smoking history, the Fagerstrom test of nicotine dependence (Heatherton, et al. 1991. "The Fagerstrom test for nicotine dependence: a revision of the Fagerstrom tolerance questionaire," *Br J Addict* 86:1119–1127) was administered. For the 47 subjects entering the study, the mean Fagerstrom score was 6.39, indicating a high degree of nicotine dependence. Other evaluations included the contemplation ladder (Biener, L and Abrams, D B. 1991. "The Contemplation Ladder: a validation of a measure of readiness to consider smoking cessation," *Health Psychol* 10:360–365) and stage of change (Prochaska, J O and Goldstein, M G. 1991. "Process of smoking cessation. Implications for clinicians," *Clin Chest Med* 12:727–735). Subjects also provided saliva specimens for measurement of cotinine, one of the main metabolites of nicotine widely used as a biomarker for assessment of direct or passive exposure to cigarette smoke.

Of the 47 subjects entering the study, 33 subjects (18 women; 15 men) satisfactorily followed the program instructions and provided complete data, such that there was complete accountability in the data for all cigarettes consumed. Table II indicates the personal objectives of the subjects upon entering the study. In comparing the group that completed the trial to those that dropped out, the only difference between the completers (33 subjects) and the drop-outs (14 subjects) was that the respective self-efficacy for quitting, or belief in the ability to quit, was lower for the drop-outs (22.3) than the completers (27.6) (t, 1.96; df=50; p=0.05).

TABLE II

Smoking Reduction Objectives of the Study Subjects

| Objective | Next 30 days | Next 6 months | Not in next 6 months | Total |
|---|---|---|---|---|
| Subjects interested in reduction only | 2 (4%) | 5 (11%) | 3 (6%) | 10 (21%) |
| Others | 24 (51%) | 13 (28%) | 0 (0%) | 37 (79%) |
| Total | 26 (55%) | 18 (38%) | 3 (6%) | 47 (100%) |

Each subject was given a treatment device which was a cigarette case similar to that shown in FIG. 2, programmed with software to execute a scheduled reduction protocol. At the baseline orientation session, each subject was given the device and instructed to load their cigarette packs into the device and to smoke ad lib during the baseline period of Day 1–Day 7. During the baseline period, the device recorded each cigarette smoked (registered by opening the top of the cigarette case), and the times of the first and last cigarette for each day.

The smoking reduction regimen used in the study is given in Table III. On Day 8, each subject's device was loaded with an individualized smoking reduction schedule based on the data recorded during the ad lib baseline period. For Treatment Week 1 beginning on Day 8, the regimen reduced cigarette allotments to 75% of baseline levels. For Treatment Week 2, the regimen reduced cigarette allotments to 50% of baseline levels, and the allotment remained at the 50% level for the remaining Treatment Week 3 and Treatment Week 4 of the study. Allotments for each day were based on specific cigarette usage and start and ending times of each discrete day of the week. For example, on Saturday of Treatment Week 1, the "smoking day" matched the hours smoked on the Saturday of the baseline period and the allotment was 75% of the number of cigarettes smoked on the Saturday of the baseline period scheduled evenly throughout the "smoking day;" then on Monday of Treatment Week 2, the "smoking day" matched the hours smoked on the Monday of the baseline period, and the allotment was 50% of the number of cigarettes smoked on the Monday of the baseline period scheduled evenly throughout the "smoking day." During the Treatment Week 1 to Treatment Week 4 regimen period, the test devices had LCD displays that revealed the number of cigarettes consumed each day and the time until the next scheduled cigarette. Additionally, the smokers were contacted weekly by telephone to discuss progress and adherence to protocol. At an exit interview at the end of Treatment Week 4, the subjects reported on product usability and were given the option of continuing with the stepwise reduction schedule leading to cessation.

TABLE III

Mathematical Descriptions of Smoking Reduction Regimen

| Unit | Number Prescribed Cigarettes |
|---|---|
| Baseline Day 1 | $n_1$ recorded, no scheduled |
| Baseline Day 2 | $n_2$ recorded, no scheduled |
| Baseline Day 3 | $n_3$ recorded, no scheduled |
| Baseline Day 4 | $n_4$ recorded, no scheduled |
| Baseline Day 5 | $n_5$ recorded, no scheduled |
| Baseline Day 6 | $n_6$ recorded, no scheduled |
| Baseline Day 7 | $n_7$ recorded, no scheduled |
| Week 1: Day 8 | $.75(n_1)$ scheduled, $n_8$ recorded |
| Week 1: Day 9 | $.75(n_2)$ scheduled, $n_9$ recorded |
| Week 1: Day 10 | $.75(n_3)$ scheduled, $n_{10}$ recorded |
| Week 1: Day 11 | $.75(n_4)$ scheduled, $n_{11}$ recorded |
| Week 1: Day 12 | $.75(n_5)$ scheduled, $n_{12}$ recorded |
| Week 1: Day 13 | $.75(n_6)$ scheduled, $n_{13}$ recorded |
| Week 1: Day 14 | $.75(n_7)$ scheduled, $n_{14}$ recorded |
| Week 2: Day 15 | $.5(n_1)$ scheduled, $n_{15}$ recorded |
| Week 2: Day 16 | $.5(n_2)$ scheduled, $n_{16}$ recorded |
| Week 2: Day 17 | $.5(n_3)$ scheduled, $n_{17}$ recorded |
| Week 2: Day 18 | $.5(n_4)$ scheduled, $n_{18}$ recorded |
| Week 2: Day 19 | $.5(n_5)$ scheduled, $n_{19}$ recorded |
| Week 2: Day 20 | $.5(n_6)$ scheduled, $n_{20}$ recorded |
| Week 2: Day 21 | $.5(n_7)$ scheduled, $n_{21}$ recorded |
| Week 3: Day 22 | $.5(n_1)$ scheduled, $n_{22}$ recorded |
| Week 3: Day 23 | $.5(n_2)$ scheduled, $n_{23}$ recorded |
| Week 3: Day 24 | $.5(n_3)$ scheduled, $n_{24}$ recorded |
| Week 3: Day 25 | $.5(n_4)$ scheduled, $n_{25}$ recorded |
| Week 3: Day 26 | $.5(n_5)$ scheduled, $n_{26}$ recorded |
| Week 3: Day 27 | $.5(n_6)$ scheduled, $n_{27}$ recorded |
| Week 3: Day 28 | $.5(n_7)$ scheduled, $n_{28}$ recorded |
| Week 4: Day 29 | $.5(n_1)$ scheduled, $n_{29}$ recorded |
| Week 4: Day 30 | $.5(n_2)$ scheduled, $n_{30}$ recorded |
| Week 4: Day 31 | $.5(n_3)$ scheduled, $n_{31}$ recorded |
| Week 4: Day 32 | $.5(n_4)$ scheduled, $n_{32}$ recorded |
| Week 4: Day 33 | $.5(n_5)$ scheduled, $n_{33}$ recorded |
| Week 4: Day 34 | $.5(n_6)$ scheduled, $n_{34}$ recorded |
| Week 4: Day 35 | $.5(n_7)$ scheduled, $n_{35}$ recorded |

For the 33 subjects that completed the reduction program, the smoking reduction regimen was successful, with 82% of the subjects achieving the targeted reduction of at least 50%.

At the end of Week 2, the % reduction in smoking rate from baseline for the group was 64%; at the end of Week 3 and Week 4, 48% reduction. Overall, the subjects averaged 90% of the targeted reduction levels over the entire study. The overall average cigarette consumption went from 25.2 cigarettes per day at baseline to 10.9 cigarettes per day post-reduction, with a mean decrease of 56.7% over the entire study. While 13,126 cigarettes were scheduled for the 33 subjects, 11,815 cigarettes were actually smoked, indicating that 10% fewer cigarettes were smoked than were prescribed, with the number of actual cigarettes smoked being at or below the prescribed number for all but one day of the study.

A substantial mean drop in cotinine levels from baseline to post-50% reduction was observed, indicating that real reductions in exposure were achieved. Mean cotinine values decreased from 375 at baseline to 270 at post-reduction, resulting in a mean decline of 28%.

Changes in self-efficacy were also observed, with the subject's confidence in the ability to quit smoking increasing as smoking levels decreased. Of the 33 subjects completing the study, 23 subjects chose to continue using the device to progress toward smoking cessation. Program durations for cessation ranged from 12 to 28 days for these subjects, depending on their original baseline smoking patterns. Of the 23 subjects continuing with the program, 16 subjects reported reaching at least an initial abstinence of 24 hours which was corroborated by usage data recorded in the device.

Another important finding of the study was that recorded smoking rates during baseline showed patterned variations that reflected differences in smoking behavior on weekdays (work days) vs. weekends (non-work days). This variation in smoking behavior over time validated the importance of using a smoking reduction regimen based on the differentiation of days, e.g., start and stop times and volumes of cigarettes smoked for each discrete "smoking day" of the week.

Another finding was that a participant scoring higher on the Fagerstrom test for nicotine dependence tended to smoke the first cigarette each day earlier than or at the first scheduled cigarette. Correspondingly, those who scored lower nicotine dependence tended to smoke the first cigarette each day at or later than their first scheduled cigarette. This finding confirmed the importance of precisely measuring the timing of the first cigarette each day as recorded by the method of the present invention. Also, monitoring a smoker's success at consuming the first cigarette in adherence to the scheduled timing can be used as a measure of the smoker's nicotine dependence. This measure can be used to differentiate smokers who are more addicted to the chemical components of the nicotine from smokers who are conditioned by habit to smoke in certain situations or when prompted by triggers or cues that they associate with smoking. By precisely measuring the timing of the first cigarette each day as recorded by the method of the present invention, these motivational effects can be identified and used as a first step toward differentiating treatment plans.

I claim:

1. A method for reducing cigarette consumption comprising:
   (a) recording data that describe a smoker's cigarette consumption during a data collection period comprising multiple units of smoking minutes and nonsmoking minutes, wherein the data collected for each unit comprise the total number of cigarettes smoked, the time of day the first cigarette is smoked, and the time of day the last cigarette is smoked;

(b) calculating the number of cigarettes scheduled for consumption during a unit of a subsequent reduced-smoking period by multiplying the goal amount of smoking reduction by said total number of smoked cigarettes recorded during a corresponding unit of said data collection period;

(c) calculating the number of possible smoking minutes for said corresponding unit of said data collection period by determining the amount of time between the time of day the first cigarette is smoked and the time of day the last cigarette is smoked;

(d) calculating the time interval between scheduled cigarette consumption events by dividing the number of possible smoking minutes determined in step (c) by the number of scheduled cigarettes determined in step (b);

(e) generating a schedule for reduced cigarette consumption during one or more units of said reduced-smoking period, said schedule providing that the time of day for the first cigarette consumption of said units of said reduced-smoking period begin at the same time or after the time of day for the first cigarette consumption recorded during said corresponding unit of said data collection period and scheduling each subsequent cigarette consumption event to occur after the previous event by the time interval determined in step (d);

(f) implementing the reduced smoking schedule through a device capable of signaling to the smoker when a cigarette is scheduled to be consumed; and (g) repeating steps (a), (b), (c), (d), (e) and (f) for subsequent reduced-smoking periods, until the number of scheduled cigarette consumption events reaches a level desired by the smoker or until no cigarettes are scheduled.

2. The method of claim 1, wherein the time of day for the first cigarette consumption event for a unit of a reduced-smoking period is scheduled to occur at the same time of day recorded during said corresponding unit of data collection period or a previous reduced-smoking period.

3. The method of claim 1, wherein the time of day for the first cigarette consumption event for a unit of a reduced-smoking period is scheduled to occur at a later start time than the time of day recorded during said corresponding unit of said previous reduced-smoking period.

4. The method of claim 3, wherein said later start time is increased in each successive unit of said reduced-smoking period.

5. The method of claim 3, wherein said later start time is from about five to about thirty minutes.

6. The method of claim 4, wherein said later start time is from about five to about thirty minutes.

7. The method of claim 1, 2, 3, 4, 5 or 6, wherein data describing a smoker's cigarette consumption are passively recorded by a device.

8. The method of claim 1, 2, 3, 4, 5 or 6, wherein the schedule for reduced cigarette consumption is generated within the device.

9. The method of claim 1, 2, 3, 4, 5, or 6, wherein the schedule for reduced cigarette consumption is generated by a remote processing means.

10. The method of claim 1, 2, 3, 4, 5 or 6, wherein data describing a smoker' cigarette consumption are actively recorded by a device.

11. The method of claim 10, wherein the schedule for reduced cigarette consumption is generated within the device.

12. The method of claim 10, wherein the schedule for reduced cigarette consumption is generated by a remote processing means.

13. The method of claim 1, 2, 3, 4, 5, or 6, wherein the data collection period is seven units, wherein each unit comprises one smoking minutes subunit in which a smoker may consume cigarettes beginning when a smoker consumes a first cigarette after awaking and ending when a smoker consumes a last cigarette before sleeping and one nonsmoking minutes subunit in which the smoker does not consume cigarettes.

14. The method of claim 1, 2, 3, 4, 5, or 6, wherein the reduced-smoking period between two and seven units, wherein each unit comprises one smoking minutes subunit in which a smoker may consume cigarettes beginning when a smoker consumes a first cigarette after awaking and ending when a smoker consumes a last cigarette before sleeping and one nonsmoking minutes subunit in which the smoker does not consume cigarettes.

15. The method of claim 1, 2, 3, 4, 5 or 6 wherein the goal amount of cigarette reduction is between 20% and 75%.

16. The method of claim 1, 2, 3, 4, 5, or 6 wherein the goal amount of cigarette reduction is between 33% and 60%.

17. The method of claim 1, 2, 3, 4, 5 or 6 wherein the goal amount of cigarette reduction is at least 50%.

18. The method of claim 15, wherein the goal amount is divided into a first goal segment and a second goal segment, said first goal segment planned to be reached in a first reduced-smoking period and said second goal segment in a second reduced-smoking period.

19. The method of claim 16, wherein the goal amount is divided into a first goal segment and a second goal segment, said first goal segment planned to be reached in a first reduced-smoking period and said second goal segment in a second reduced-smoking period.

20. The method of claim 17, wherein the goal amount is divided into a first goal segment and a second goal segment, said first goal segment planned to be reached in a first reduced-smoking period and said second goal segment in a second-reduced smoking period.

21. The method of claim 20, wherein said first goal segment is about 30–40% reduction and said second goal segment is at least 10–20% reduction.

22. The method of claim 21, wherein said first goal segment is 37% reduction.

23. A method for reducing cigarette consumption comprising:

(a) providing a programmable device suitable for holding cigarettes having a lid which removably engages with the device, wherein the lid possesses an actuation means that provides a signal to the data collection unit integrated in the device upon change of the position of the lid from a first closed position to a second open position, wherein each change of the position of the lid from a first closed position to a second opened position is recorded as a smoking event and a communication means perceivable to the smoker;

(b) recording data that describe a smoker's cigarette consumption during a data collection period, wherein the data collected comprise the total number of cigarettes smoked, the time of day the first cigarette is smoked, and the time of day the last cigarette is smoked;

(c) calculating the number of cigarettes scheduled for consumption during a unit of a subsequent reduced-smoking period by multiplying the goal amount of smoking reduction by said total number of smoked cigarettes recorded during a corresponding unit of said data collection period;

(d) calculating the number of possible smoking minutes for said corresponding unit of said data collection period by determining the amount of time between the time of day the first cigarette is smoked and the time of day the last cigarette is smoked;

(e) calculating the time interval between scheduled cigarette consumption events by dividing the number of possible smoking minutes determined in step (d) by the number of scheduled cigarettes determined in step (c);

(f) generating a schedule for reduced cigarette consumption during a unit of said reduced-smoking period by having the time of day for the first cigarette consumption of begin at the same time or after the time of day for the first cigarette consumption recorded during said corresponding unit of said data collection period and scheduling each subsequent cigarette consumption event to occur after the previous event by the time interval determined in step (e);

(g) implementing the reduced smoking schedule through said device capable of signaling to the smoker when a cigarette is scheduled to be consumed; and (h) repeating steps (b), (c), (d), (e), (f) and (g) for subsequent reduced-smoking periods, wherein said data collection period is the previous reduced-smoking period, until the number of scheduled cigarette consumption events reaches a level desired by the smoker or until no cigarettes are scheduled.

24. The method of claim 23, wherein the time of day for the first cigarette consumption event for a unit of a reduced-smoking period is scheduled to occur from about zero to about 15 minutes later than the time of day recorded during said corresponding unit of said data collection unit or a previous reduced-smoking period if said smoker exhibited nicotine addiction or a tendency to smoke the first cigarette of the unit at or before the scheduled time of day for the first cigarette consumption event in the previous reduced-smoking period, or wherein the time of day for the first cigarette consumption event for a unit of a reduced-smoking period is scheduled to occur from about 5 about 30 minutes later than the time of day recorded during said corresponding unit of said previous reduced-smoking period if said smoker exhibited a tendency to smoke the first cigarette of the unit later than the scheduled time of day for the first cigarette of the unit later than the scheduled time of day for the first cigarette consumption event in the previous reduced-smoking period.

25. The method of claim 23 or 24, wherein steps (b), (c), (d), (e), (f), (g) or (h) are performed by a data processing portion of the device.

26. The method of claim 23 or 24, wherein at least one step of steps (b), (c), (d), (e), (f), (g) or (h) is performed by a remote data processing portion accessible through the device.

27. A method for reducing cigarette consumption comprising:

(a) providing a programmable device comprising a recording means by which the smoker signals a smoking event and a communication means perceivable to the smoker;

(b) recording data that describe a smoker's cigarette consumption during a data collection period, wherein the data collected comprise the total number of cigarettes smoked, the time of day the first cigarette is smoked, and the time of day the last cigarette is smoked;

(c) calculating the number of cigarettes scheduled for consumption during a unit of a subsequent reduced-smoking period by multiplying the goal amount of smoking reduction by said total number of smoked cigarettes recorded during a corresponding unit of said data collection period;

(d) calculating the number of possible smoking minutes for said corresponding unit of said data collection period by determining the amount of time between the time of day the first cigarette is smoked and the time of day the last cigarette is smoked;

(e) calculating the time interval between scheduled cigarette consumption events by dividing the number of possible smoking minutes determined in step (d) by the number of scheduled cigarettes determined in step (c);

(f) generating a schedule for reduced cigarette consumption during a unit of said reduced-smoking period by having the time of day for the first cigarette consumption of begin at the same time or after the time of day for the first cigarette consumption recorded during said corresponding unit of said data collection period and scheduling each subsequent cigarette consumption event to occur after the previous event by the time interval determined in step (e);

(g) implementing the reduced smoking schedule through said device capable of signaling to the smoker when a cigarette is scheduled to be consumed; and (h) repeating steps (b), (c), (d), (e), (f) and (g) for subsequent reduced-smoking periods, wherein said data collection period is the previous reduced-smoking period, until the number of scheduled cigarette consumption events reaches a level desired by the smoker or until no cigarettes are scheduled.

28. The method of claim 27, wherein the time of day for the first cigarette consumption event for a unit of a reduced-smoking period is scheduled to occur from about zero to about 15 minutes later than the same time of day recorded during said data collection unit or a previous reduced-smoking period if said smoker exhibited nicotine addiction or a tendency to smoke the first cigarette of the unit at or before the scheduled time of day for the first cigarette consumption event in the previous reduced-smoking period, or wherein the time of day for the first cigarette consumption event for a unit of a reduced-smoking period is scheduled to occur from about 5 to about 30 minutes later than the time of day recorded during said corresponding unit of said previous reduced-smoking period if said smoker exhibited a tendency to smoke the first cigarette of the unit later than the scheduled time of day for the first cigarette consumption event in the previous reduced-smoking period.

29. The method of claim 27 or 28, wherein steps (b), (c), (d), (e), (f), (g) or (h) are performed by a data processing portion of the device.

30. The method of claim 27 or 28, wherein at least one step of steps (b), (c), (d), (e), (f), (g) or (h) is performed by a remote data processing portion accessible through the device.

* * * * *